United States Patent
Schwarze et al.

(10) Patent No.: US 8,641,145 B2
(45) Date of Patent: Feb. 4, 2014

(54) ASSEMBLY COMPRISING A DETENT FITTING AND A FREE-PIVOTING MECHANICS

(75) Inventors: Peter Schwarze, Leipzig (DE); Frank Schlemmer, Unterlauter (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 615 days.

(21) Appl. No.: 12/815,245

(22) Filed: Jun. 14, 2010

(65) Prior Publication Data

US 2011/0006583 A1    Jan. 13, 2011

(30) Foreign Application Priority Data

Jun. 18, 2009    (DE) .......................... 10 2009 029 858

(51) Int. Cl.
*B60N 2/02* (2006.01)
(52) U.S. Cl.
USPC .... 297/367 R; 297/366; 297/376; 297/378.12
(58) Field of Classification Search
USPC .......................... 297/367 R, 366, 376, 378.12
See application file for complete search history.

(56) References Cited

U.S. PATENT DOCUMENTS 6,007,153 A * 12/1999 Benoit et al. ............. 297/378.12
6,082,821 A * 7/2000 Baloche et al. .......... 297/354.12

(Continued)

FOREIGN PATENT DOCUMENTS

DE    195 23 254 A1    1/1997
DE    10 2006 015 560 B3    8/2007

(Continued)

OTHER PUBLICATIONS

Chinese examination report for Application No. 201010208953.9, dated Dec. 21, 2012, 10 pages.

*Primary Examiner* — Laurie Cranmer
(74) *Attorney, Agent, or Firm* — Christie, Parker & Hale, LLP

(57) ABSTRACT

An assembly of a vehicle comprises a first vehicle part and a second vehicle part being pivotal relative to the first vehicle part, at least one detent fitting which is constituted to hold the two vehicle parts in position to each other in a locked state and, therein, to establish a force flow between the two vehicle parts and to allow for a pivoting of the two vehicle parts relative to each other in an unlocked state, an actuation shaft for actuating the at least on detent fitting and a free-pivoting mechanics which is actuatable in order to disrupt the force flow between the two vehicle parts for providing a free-pivoting function. Herein, it is provided that the free-pivoting mechanics for providing the free-pivoting function interacts with the actuation shaft and, therein, is constituted to come into operational connection with the actuation shaft only if the free-pivoting mechanics is actuated. The invention further relates to a free-pivoting mechanics for a vehicle seat and a method for providing a free-pivoting function. In this way, an assembly of a vehicle, a free-pivoting mechanics and a method for providing a free-pivoting function for actuating at least one detent fitting are obtained which do no not influence the normal operation of the detent fitting, use a mechanic for providing a free-pivoting function which is of a comparatively simple construction and in a reliable way provides a free-pivoting function.

22 Claims, 17 Drawing Sheets

(56) References Cited

U.S. PATENT DOCUMENTS

| | | | |
|---|---|---|---|
| 6,454,354 B1 | 9/2002 | Vossmann et al. | |
| 6,619,744 B2 * | 9/2003 | Reubeuze | 297/378.12 |
| 7,055,906 B2 * | 6/2006 | Shinozaki | 297/367 R |
| 7,159,945 B2 * | 1/2007 | Eppert | 297/367 R |
| 7,380,883 B2 * | 6/2008 | Koumura | 297/367 R |
| 7,648,205 B2 * | 1/2010 | Zou et al. | 297/367 R |
| 7,677,667 B2 * | 3/2010 | Peters et al. | 297/367 R |
| 2002/0096924 A1 | 7/2002 | Reubeuze | |
| 2003/0080600 A1 | 5/2003 | Eppert | |
| 2009/0085391 A1 | 4/2009 | Peters et al. | |

FOREIGN PATENT DOCUMENTS

| | | |
|---|---|---|
| DE | 10 2007 042 604 A1 | 5/2008 |
| DE | 10 2007 030 545 B3 | 11/2008 |
| EP | 1 066 170 B2 | 1/2001 |
| EP | 1 237 748 B1 | 9/2002 |
| WO | WO 2008/058762 A1 | 5/2008 |

* cited by examiner

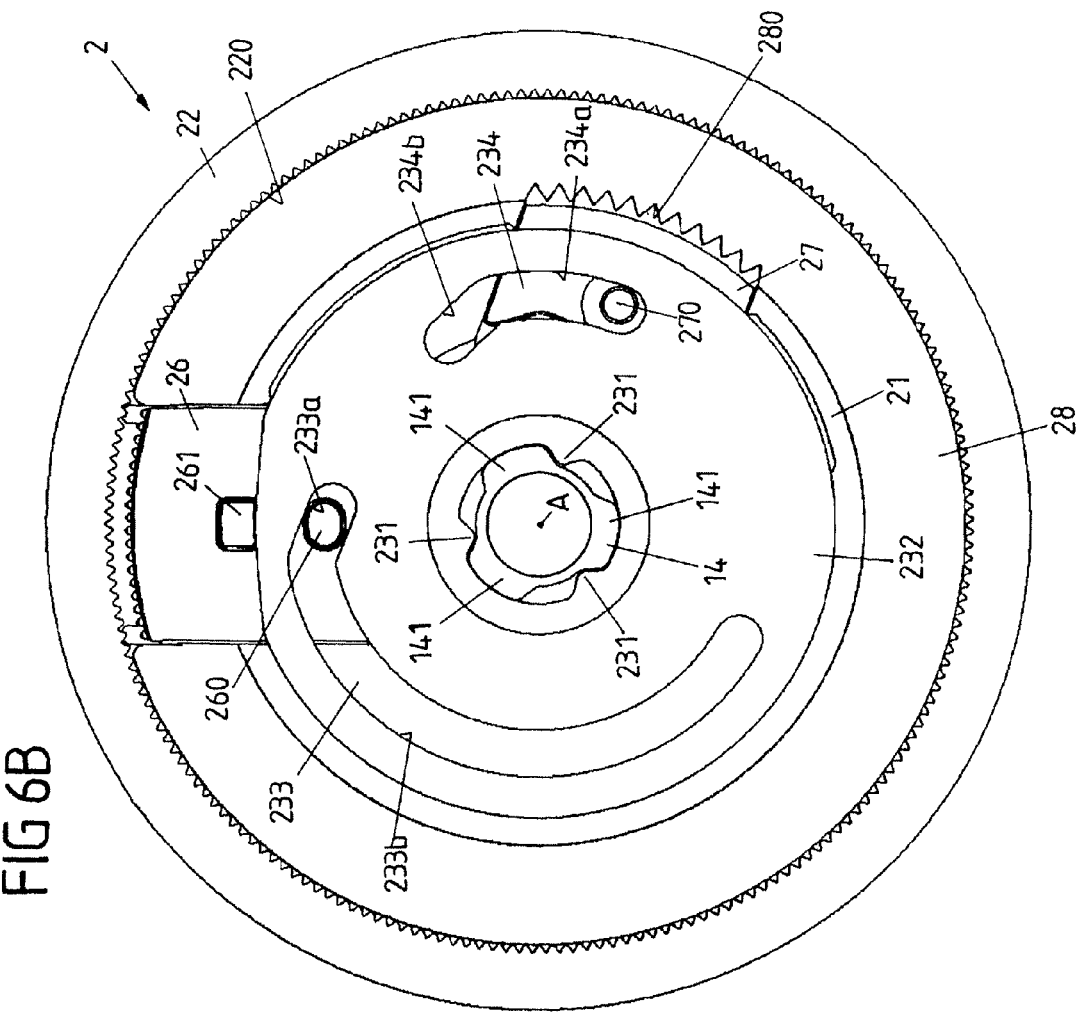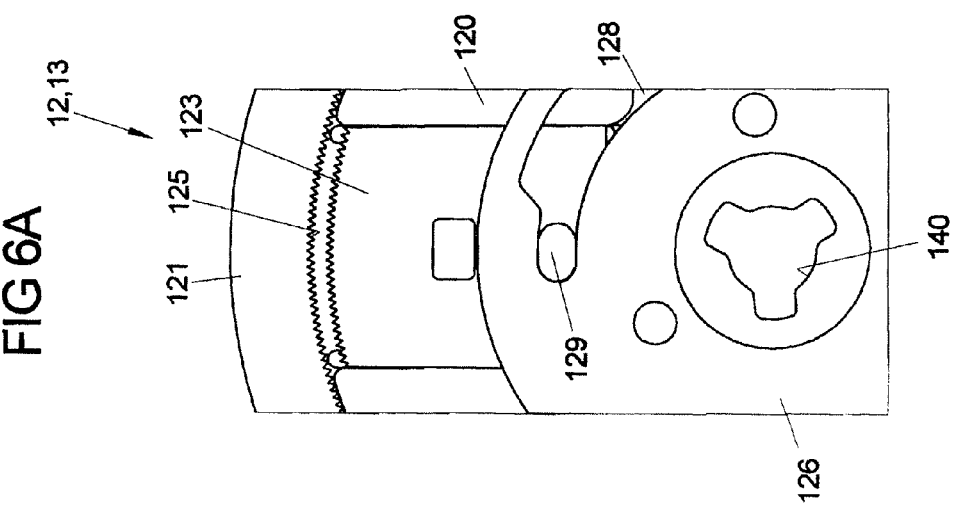

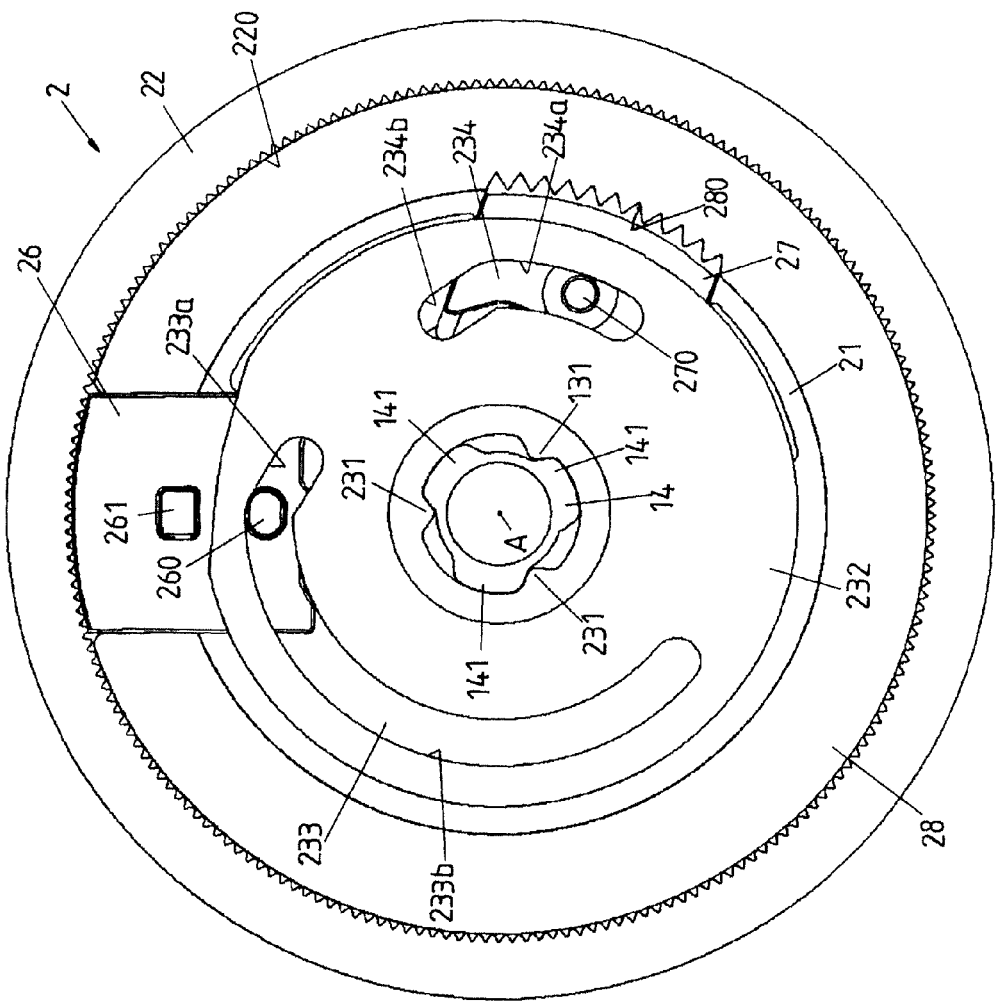
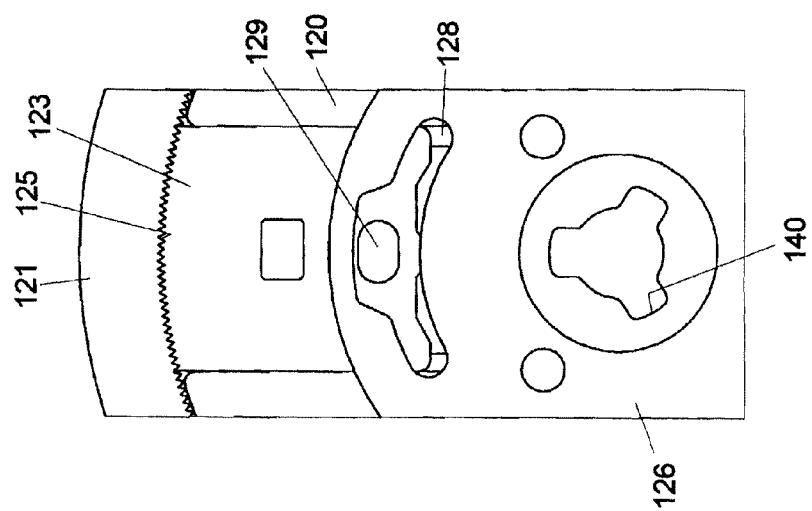
FIG 8A
FIG 8B

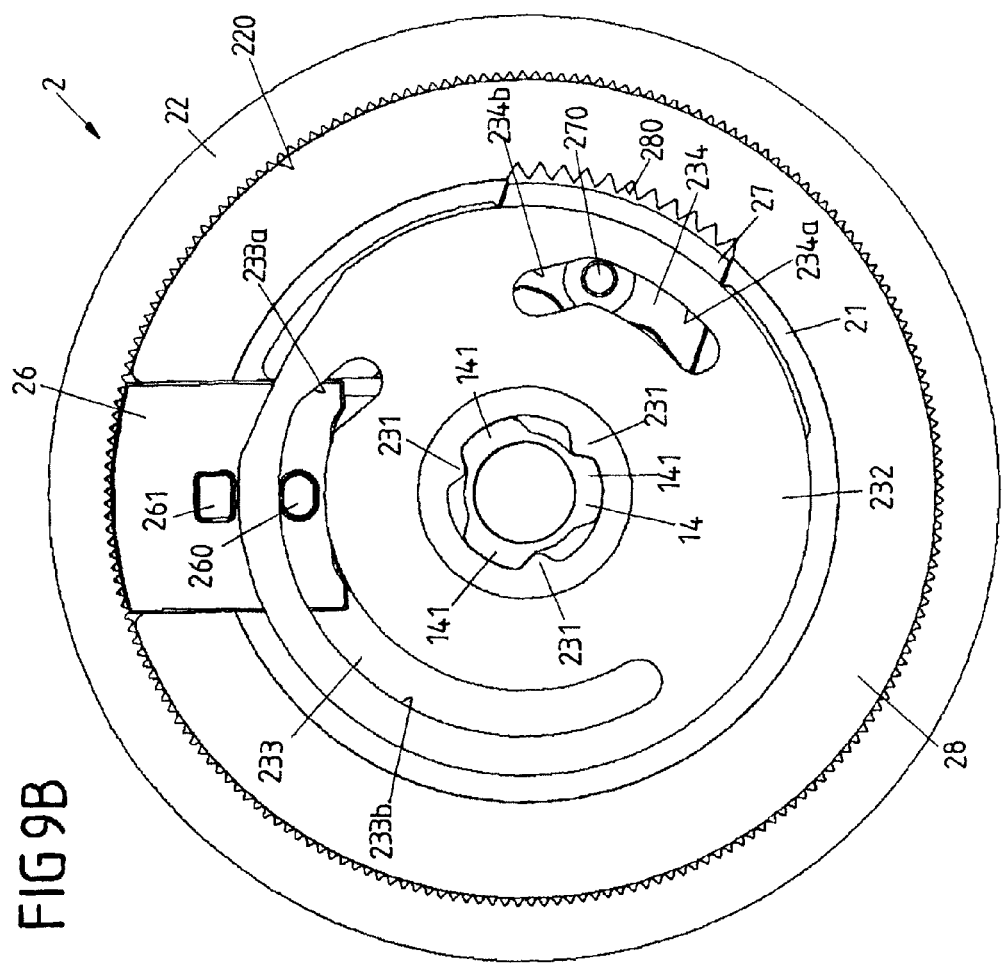
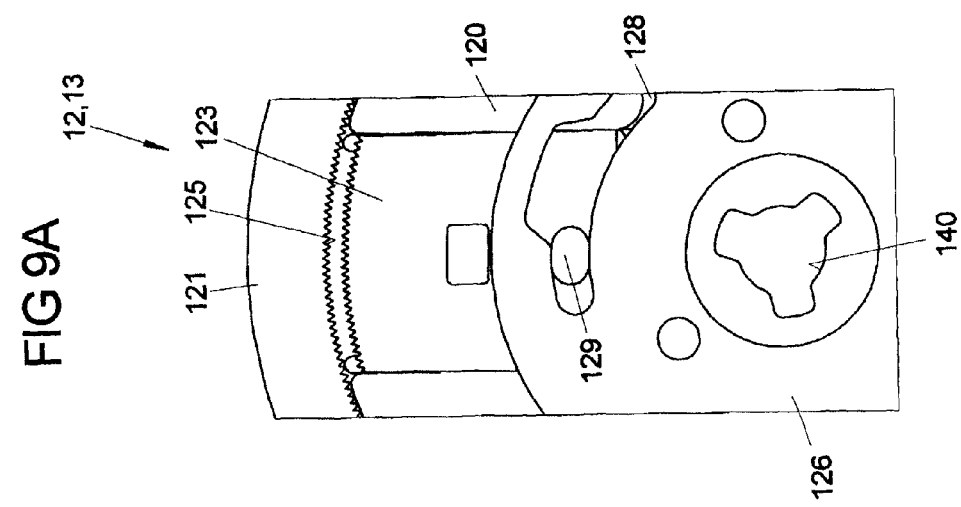
FIG 9B
FIG 9A

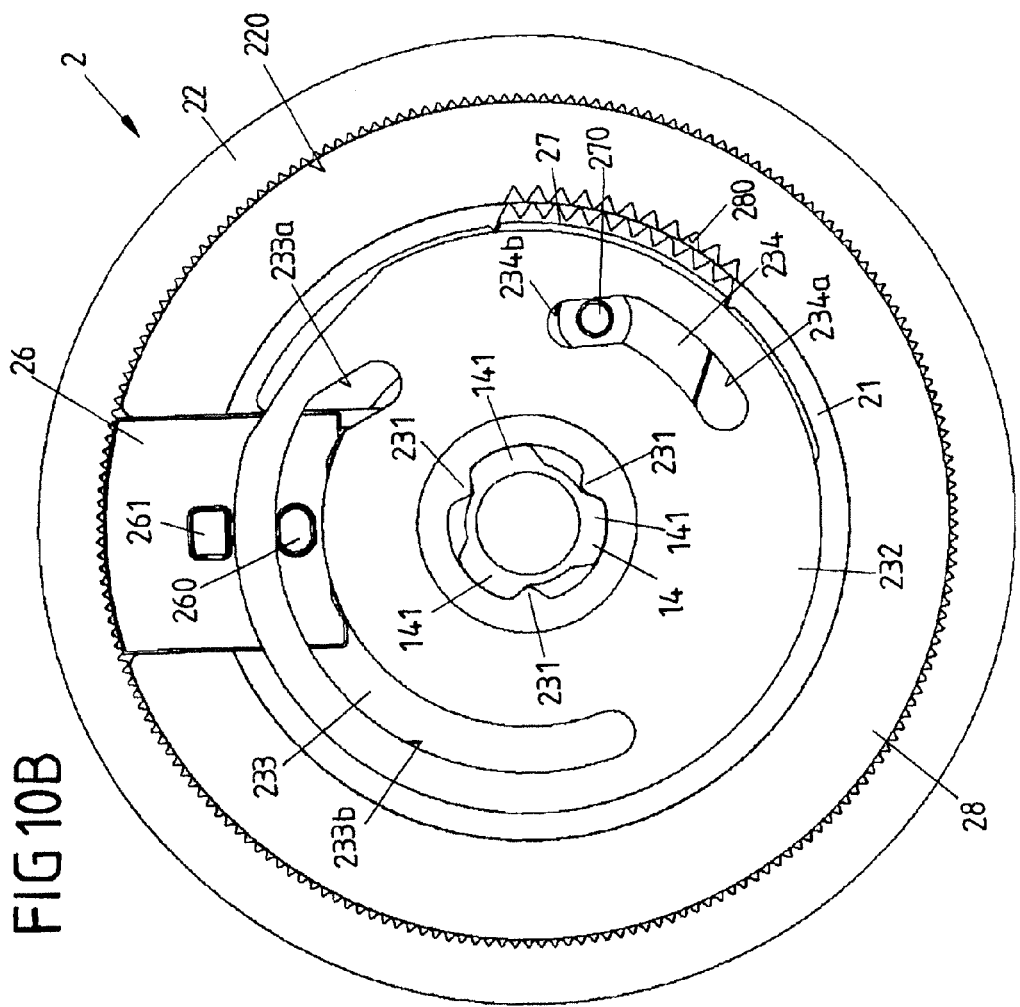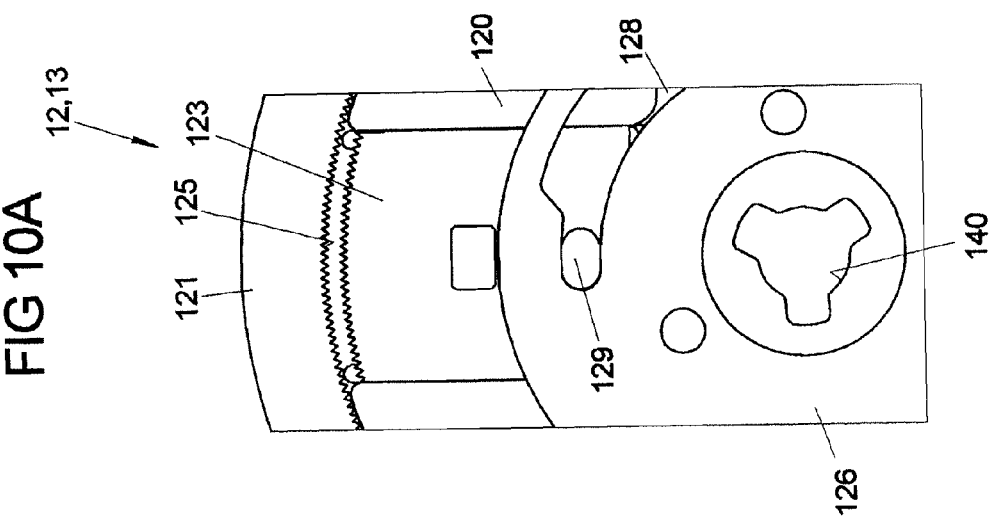

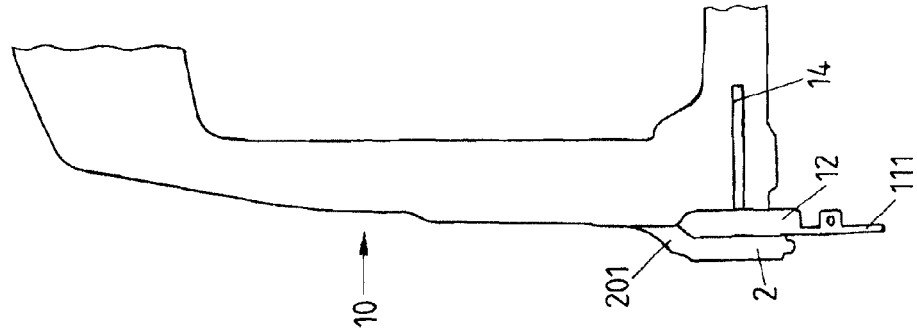
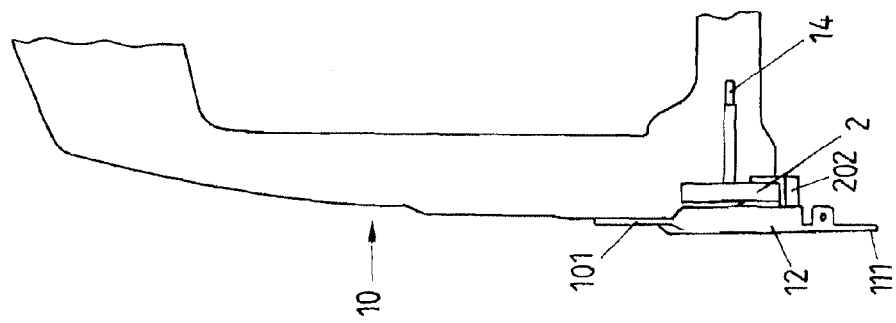

ASSEMBLY COMPRISING A DETENT FITTING AND A FREE-PIVOTING MECHANICS

CROSS-REFERENCE TO A RELATED APPLICATION

This application claims priority to and the benefit of German Patent Application Number 10 2009 029 858.4, filed on Jun. 18, 2009, the disclosure of which is incorporated herein in its entirety by reference.

BACKGROUND

The invention relates to an assembly of a vehicle according to the preamble of claim 1 and a free-pivoting mechanics for a vehicle seat and a method for providing a free-pivoting function for actuating at least one detent fitting.

An assembly of this kind comprises a first vehicle part and a second vehicle part which is pivotable with respect to the first vehicle part, at least one detent fitting and a free-pivoting mechanics. The first and the second vehicle part may for example be a backrest and a seat part of a vehicle seat which are connected to each other via the detent fitting. The detent fitting herein is formed to hold, in a locked state, the two vehicle parts in position with respect to each other and to establish a force flow between the two vehicle parts and, in an unlocked state, to allow for a pivoting of the two vehicle parts relative to each other.

In other words, the detent fitting locks, in its locked state, the two vehicle parts with respect to each other such that the vehicle parts cannot be pivoted with respect to each other. For this, the detent fitting establishes a force flow between the two vehicle parts such that the forces acting onto one of the vehicle parts are introduced via the detent fitting into the other vehicle part. In this way, the forces for example acting onto a backrest are introduced via the detent fitting into the seat part and via the seat part into the vehicle floor.

To be able to pivot the backrest relative to the seat part, the detent fitting can be unlocked such that the force flow between the two vehicle parts, namely between the backrest and the seat part, is suspended and the backrest is pivotable relative to the seat part and adjustable in its position.

For actuating the at least one detent fitting an actuation shaft is provided which is for example connected to an actuation lever and is rotatable about a rotational axis for actuation.

For providing a so called "easy-entry" function (for an entrance to a rear bench located behind a vehicle seat) or a "fold-flat" function (for pivoting a backrest forward into a flat position for providing a tray for example for a laptop or the like) common detent fittings provide means to allow for a so called free-pivoting of the backrest relative to the seat part in a predefined angular range. A free-pivoting in this context is to be understood as a free pivoting of two vehicle parts relative to each other during which the two vehicle parts within at least a predefined angular range cannot be locked with respect to each other, even if an actuation lever provided for the actuation is released. For this, usually a free-pivoting mechanics can be provided which can be actuated to disrupt the force flow between the two vehicle parts for providing the free-pivoting function such that the two vehicle parts can be pivoted freely with respect to each other.

Common free-pivoting mechanics for detent fittings use a mechanics which is provided in addition to the detent fitting and comprises the same center of rotation as the detent fitting or a center rotation that is radially offset relative to the center of rotation of the detent fitting. If the free-pivoting mechanics uses the same center of rotation as the detent fitting, further fitting parts are provided for example in an axially offset manner with respect to the detent fitting which increase the structural space of the detent fitting in the axial direction and the weight of the detent fitting. If a radially offset center of rotation is used within the context of for example a pawl/friction-cam solution, the required structural space is increased in particular in the radial direction.

Within a detent fitting for a vehicle seat known from DE 195 232 54 A1 two fitting parts which are pivotal with respect to each other about a longitudinal axis of a pin are provided which can be locked to each other via a locking device in a positive locking manner. In addition, a mechanic memory device is provided which by means of a stop allows, after pivoting the one fitting part out of an arbitrary pivoting position in the one direction, to again find the initial pivoting position.

Within an assembly known from DE 10 2007 042 604 A1 two fitting parts are connected to each other and are adjustable with respect to each other via an adjustment gearing that is adjustable in a stepless fashion, wherein the first fitting part by means of a locking device can be locked with respect to the adjustment gearing and, after releasing the locking device, can be freely pivoted with respect to the adjustment gearing. By releasing the locking device the first fitting part can be decoupled from the adjustment gearing such that a free-pivoting of a backrest connected to the first fitting part is possible.

From EP 1237 748 B1 a detent fitting for a vehicle seat is known in which a fitting part fixedly connected to a seat is mounted pivotally with respect to a fitting part which is fixedly connected to a backrest. On one of the fitting parts at least one pawl is provided which can be brought, in the radial direction, into or out of a locking position with respect to the other fitting part and which can be actuated by means of an actuation lever for actuating the detent fitting and for adjusting the backrest inclination. The detent fitting comprises a memory device for storing a desired adjustable backrest inclination and a free-pivoting device which can be triggered via a separate actuation element, both of which are arranged outside of the force transfer flow from the pivotal fitting part to the fixed fitting part.

Other detent fittings are known in which a free-pivoting function is integrated directly in the actual mechanics of the detent fitting. For example, a detent fitting known from EP 1 066 170 B2 comprises locking pawls which are mounted in a radially displaceable manner on a first fitting part and which can be brought into engagement with a toothing on a second fitting part for locking the detent fitting. On the second fitting part an insert ring with free-pivoting sections pointing radially inwards is provided which in predefined angular ranges in a mechanical fashion prevent that the locking pawls can come into engagement with the toothing on the second fitting part. In these predefined angular ranges, thereby, a free-pivoting of the fitting parts relative to each other is possible.

Common detent fittings having a free-pivoting mechanics comprise—dependent on their structural built—the disadvantage that the free-pivoting mechanics is arranged within the force flow between the fitting parts and in the normal operation state of the detent fitting must absorb and transfer forces. Free-pivoting mechanics of this kind therefore must be dimensioned in a sufficiently strong manner. On the other hand free-pivoting mechanics which are not arranged within the force flow between the fitting parts are complicated in their structural built and require a comparatively large amount of additional parts. Thus, the structural space of a detent fitting is increased substantially. In detent fittings, in contrast, in which free-pivoting ranges are provided by mechanical means integrated into the detent fitting, for example by providing an insert ring, the ranges in which vehicle parts can be locked with respect to each other are limited from the outset. In the free-pivoting ranges a locking of the vehicle parts with respect to each other is not possible and additionally, a memory function cannot be realized without further ado.

SUMMARY

It is an object of the invention to provide an assembly of a vehicle, a free-pivoting mechanics and a method for providing a free-pivoting function for actuating at least one detent fitting which do not influence the normal operation of the detent fitting, use a mechanics for providing a free-pivoting function of comparatively simple built and provide a free-pivoting function in a reliable fashion.

Herein it is provided that the free-pivoting mechanics, for providing the free-pivoting function, acts together with the actuation shaft and therein is constituted to come into operational connection with the actuation shaft only if the free-pivoting mechanics is actuated.

The assembly according to the invention on the one hand comprises a detent fitting for adjusting two vehicle parts relative to each other, for example for adjusting a backrest of a vehicle seat relative to a seat part and on the other hand a free-pivoting mechanics for providing for example a so called easy-entry function or a so called fold-flat function. During normal operation a passenger can adjust the adjusting position of the two vehicle parts through actuating the detent fitting to, in this way, for example adapt the backrest inclination of a backrest relative to the seat part. The adjusting of the adjusting position herein is possible, via the detent fitting, in small steps or even stepless such that the desired pivotal position can be adjusted in a precise fashion. To pivot the two vehicle parts with respect to each other in a simple manner for example in the context of an easy-entry function or a fold-flat function (to for example pivot a backrest forward) in addition the free-pivoting mechanics is provided which according to the invention acts onto the actuation shaft of the detent fitting, thereby actuates the detent fitting and allows for a free-pivoting of the two vehicle parts relative to each other.

In that the free-pivoting mechanics is constituted to come into engagement with the actuation shaft only in case of actuation it is ensured that the free-pivoting mechanics during normal operation of the detent fitting, namely when actuating the detent fitting for adjusting the pivoting position of the two vehicle parts, has no influence on the operational behaviour. Only upon actuation of the free-pivoting mechanics, the free-pivoting mechanics comes into operational connection with the actuation shaft. If the free-pivoting mechanics is not actuated, the actuation shaft and the free-pivoting mechanics are not in operational connection.

It is an advantage of a free-pivoting mechanics of this kind that, in the non-actuated state, it is arranged outside of the force flow between the two vehicle parts. If the free-pivoting mechanics is not actuated, the system acts as if the free-pivoting mechanics is not present at all. The force flow in the locked state of the detent fitting, via which forces are introduced from one vehicle part to the other, is independent of the free-pivoting mechanics which thereby can be constructed in a comparatively simple and light manner, because during normal operation it does not have to absorb forces for supporting the one vehicle part relative to the other.

The free-pivoting mechanics acts, via the actuation shaft, together with the at least one detent fitting in that it unlocks the detent fitting when actuating the free-pivoting mechanics and thereby allows for a free-pivoting of the vehicle parts relative to each other. The coupling between the detent fitting and the free-pivoting mechanics is, herein, constituted such that the free-pivoting mechanics on the one hand can actuate the detent fitting, on the other hand, however, a normal actuation of the detent fitting takes place independent from the free-pivoting mechanics. Via the free-pivoting mechanics, hence, an actuation of the detent fitting for example for providing an easy-entry function or a fold-flat function is possible. At the same time, the detent fitting can be actuated for the normal adjustment of the backrest inclination of a back seat independent from the free-pivoting mechanics, namely without the latter is imposed with the adjustment forces.

Advantageously, the free-pivoting mechanics is formed as a structural unit which is separate from the at least one detent fitting. The free-pivoting mechanics, thus, represents an independent structural unit which in modular fashion can be connected with a detent fitting. This allows for example to upgrade already installed detent fittings with a free-pivoting mechanics or to offer systems by choice with or without a free-pivoting mechanics, wherein the actual detent fitting in its structural built is independent on whether a free-pivoting mechanics is used or not.

For coupling the free-pivoting mechanics with the actuation shaft the free-pivoting mechanics can for example comprise a control element which for actuating the free-pivoting mechanics can be actuated. The control element is arranged preferably on the actuation shaft, wherein the control element and the actuation shaft are constituted such that during actuation of the control element the control element comes into operational connection with the actuation shaft, however during actuation of the actuation shaft the actuation shaft does not come into operational connection with the control element.

The control element can for example be arranged concentrically with regard to the actuation shaft being rotatable about a rotational axis, wherein the control element comprises noses on an inner bore encompassing the actuation shaft, the noses interacting with an outer contour of the actuation shaft. Via the noses, then, when actuating the free-pivoting mechanics an engagement of the control element with the actuation shaft is established such that via the control element the actuation shaft and, hence, the detent fitting can be actuated. At the same time the control element and the actuation shaft are designed with respect to each other such that when introducing an adjustment force via the actuation shaft, namely when actuating the detent fitting in the usual manner via the actuation shaft, the control element and the actuation shaft do not come into operational connection, the adjustment forces hence are not introduced into the free-pivoting mechanics and the free-pivoting mechanics, thus, in case of normal operation is not subjected to forces. This for example can be achieved in that the actuation shaft for actuating the detent fitting can be rotated only in one rotational direction in which the control element and the actuation shaft cannot interact. If, however, the control element is actuated, the control element and the actuation shaft move in the opposite direction with respect to each other such that the control element, via the noses arranged thereon, comes into contact with the outer contour of the actuation shaft.

During actuation of the free-pivoting mechanics it may be provided that the control element first is to be rotated by a predefined angle relative to the actuation shaft before the noses come into contact with the outer contour of the actuation shaft. In the initial position the control element and the actuation shaft hence are not in contact. Only after the control element and the actuation shaft have been rotated with respect to each other by a predefined angle the operational connection between the control element and the actuation shaft is established and the actuation shaft is actuated.

Advantageously, the free-pivoting mechanics can, in addition, be constituted to provide a memory function which during actuation of the free-pivoting mechanics has the effect that, after pivoting the vehicle parts out of an initial position, the vehicle parts are locked again in their initial position when pivoting them back. By means of the memory function the free-pivoting mechanics stores the initial position and in this way ensures that after pivoting and back pivoting for example a backrest the backrest comes to lie in the original initial position. This improves the comfort for a passenger who can bring the backrest, after pivoting for example in the context of an easy-entry function, back into its initial position in an easy manner without having to newly adjust the backrest inclination.

In a specific embodiment the free-pivoting mechanics may for example comprise a guide plate being arranged in a rotationally fixed manner on one of the two vehicle parts and a tooth plate being arranged in a rotationally fixed manner on the other of the vehicle parts. In the non-actuated state of the free-pivoting mechanics the guide plate and the tooth plate can be pivoted with respect to each other in an unhindered manner without further ado such that the normal adjustment of the vehicle parts is not affected. For controlling the free-pivoting mechanics, a first pawl element which is movably arranged on the guide plate for establishing a locking of the guide plate with an intermediate ring being mounted pivotally with respect to the tooth plate and to the guide plate, and a second pawl element being movably mounted on the intermediate ring for establishing a locking of the intermediate ring with the tooth plate is provided. The first pawl element serves for providing the memory function, whereas the second pawl element unlocks the free-pivoting mechanics for providing the free-pivoting function and ensures that the detent fitting can not come into its locked state when the free-pivoting mechanics is actuated such that the free-pivoting mechanics remains in its actuated state even when releasing the actuation lever and a locking of the detent fitting during a free-pivoting is prevented.

The pawl elements may, for establishing the locking, for example comprise a toothing for establishing a positive connection or a friction face for establishing a frictional connection.

If the free-pivoting mechanics is actuated, the free-pivoting mechanics transfers the detent fitting into an unlocked state and assumes different intermediate states until a free-pivoting state is reached in which a free-pivoting of the two vehicle parts relative to each other is possible.

In the non-actuated state of the free-pivoting mechanics the first pawl element is in engagement with the intermediate ring for locking the guide plate with the intermediate ring and at the same time the second pawl element is not in engagement with the tooth plate such that the intermediate ring is not locked with the tooth plate. In this way, the guide plate is coupled with the intermediate ring, but the intermediate ring is not coupled with the tooth plate such that guide plate and tooth plate can be pivoted freely with respect to each other. This non-actuated state of the free-pivoting mechanics corresponds to the normal operation state in which the detent fitting can be actuated and the free-pivoting mechanics does not interact with the actuation shaft such that, when actuating the detent fitting, the free-pivoting mechanics does not influence the operation and does not hinder a pivoting of the two vehicle parts relative to each other.

If the free-pivoting mechanics is actuated, it first comes into a first intermediate state in which the first pawl element is in engagement with the intermediate ring for locking the guide plate with the intermediate ring, at the same time also the second pawl element is in engagement with the tooth plate for locking the intermediate ring with the tooth plate and the at least one detent fitting still is in the locked state. Guide plate and tooth plate, hence, are locked with respect to each other such that via the guide plate and the tooth plate a force flow between the two vehicle parts parallel to the detent fitting is provided. A pivoting of the two vehicle parts relative to each other in this first intermediate state is not possible because both the detent fitting and the free-pivoting mechanics lock the two vehicle parts relative to each other.

In a second intermediate state when actuating the free-pivoting mechanics the first pawl element still is in engagement with the intermediate ring for locking the guide plate with the intermediate ring. At the same time also the second pawl element is in engagement with the tooth plate for locking the intermediate ring with the tooth plate such that the two vehicle parts are locked to each other by the locked free-pivoting mechanics and cannot be adjusted. In this second intermediate state the free-pivoting mechanics has, by acting onto the actuation shaft, actuated the detent fitting and has transferred it into an unlocked state such that the force flow via the detent fitting is disrupted. In this second state the two vehicle parts are locked to each other only by the free-pivoting mechanics. This second intermediate state is assumed to ensure that the detent fitting is completely unlocked prior to allowing a free-pivoting of the two vehicle parts relative to each other. In this way it is prevented that toothings of the detent fitting slide along each other when the locking is not completely released yet and thus may lead to a damaging or even destruction of the detent fitting or to unwanted acoustical noise such as a scratching or scraping when pivoting the vehicle parts.

In the second intermediate state the locking of the two vehicle parts to each other takes place exclusively via the free-pivoting mechanics such that, for this, a sufficient dimensioning of the free-pivoting mechanics and its pawls for transferring the force flow must be provided (wherein it can be taken into account that a vehicle seat usually is not loaded when starting a free-pivoting). This in particular concerns the forces for example onto a backrest occurring during a panic exit, namely during a fast, powerful pivoting of the backrest. For this case it also can be provided that the locking of the free-pivoting mechanics in such a panic case, namely for example when exceeding an upper critical load, is released.

Finally, the free-pivoting mechanics during actuation enters a free-pivoting state in which the first pawl element no longer is in engagement with the intermediate ring (such that the intermediate ring can be freely pivoted relative to the guide plate), the second pawl element is in engagement with the tooth plate for locking the intermediate ring with the tooth plate and at the same time the at least one detent fitting is in the unlocked state. In this free-pivoting state both the free-pivoting mechanics and the detent fitting are unlocked such that the vehicle parts can freely be pivoted relative to each other.

If after a free-pivoting of for example the backrest the backrest is pivoted back, the first pawl element again comes into engagement with the intermediate ring as soon as the backrest is in its initial position such that the free-pivoting mechanics via the second and first intermediate state again is brought into its non-actuated state in which the backrest via the locked detent fitting is held in position.

The guide plate, the tooth plate and the intermediate ring advantageously are arranged concentrically to the actuation shaft for actuating the at least one detent fitting, wherein the control element for actuation interacts with the first and second pawl element. Via the control element, thus, the free-pivoting mechanics is actuated, the first and second pawl element is brought in a suitable manner corresponding to the states into engagement or out of engagement with the in each case associated parts and, hence, the functionality of the free-pivoting mechanics is controlled.

For interaction of the control element with the pawl elements the control element can comprise slotted guides into which the pawl elements for example via noses engage and by which the functionality of the pawl elements thereby is defined. When actuating the control element the noses of the pawl elements slide along the in each case associated slotted guide and thus are actuated to be brought into engagement or out of engagement with the associated parts.

The object furthermore is achieved by a free-pivoting mechanics for a vehicle seat which is constituted and provided to interact with at least one detent fitting for locking two vehicle parts relative to each other. The at least one detent fitting is formed to hold in a locked state the two vehicle parts in position to each other and, thereby, to establish a force flow between the two vehicle parts and in an unlocked state to allow a pivoting of the vehicle parts relative to each other. The free-pivoting mechanics can be actuated to disrupt the force flow between the two vehicle parts for providing a free-pivoting function. According to the invention it is provided that the free-pivoting mechanics for providing the free-pivoting function is constituted to interact with an actuation shaft for actuating the at least one detent fitting and herein to come into engagement with the actuation shaft only if the free-pivoting mechanics is actuated.

The free-pivoting mechanics can advantageously be formed as a separate structural unit and can in this way be mounted as an additional part on a detent fitting assembly. The free-pivoting mechanics can, thus, serve in a modular way for upgrading an assembly and can be fabricated and operated separately from other parts.

The free-pivoting mechanics acts, in the actuation case, together with the actuation shaft of the detent fitting, wherein in the non-actuated state the free-pivoting mechanics does not influence the normal operation of the detent fitting, the detent fitting assembly hence behaves as if the free-pivoting mechanics is not present.

The object furthermore is achieved by a method for providing a free-pivoting function for actuating at least one detent fitting which is constituted to hold in a locked state two vehicle parts in position relative to each other and to hence establish a force flow between the two vehicle parts and in an unlocked state to allow for a pivoting of the vehicle parts relative to each other. For providing a free-pivoting function a free-pivoting mechanics is actuated to disrupt the force flow between the two vehicle parts. Within the method according to the invention the free-pivoting mechanics interacts with an actuation shaft for actuating the at least one detent fitting and comes into operational connection with the actuation shaft only if the free-pivoting mechanics is actuated.

With regard to the effects and advantages as well as advantageous embodiments of the free-pivoting mechanics it is referred to the explanations above which analogously are valid also for the method.

BRIEF DESCRIPTION OF THE DRAWINGS

The idea underlying the invention shall subsequently be explained further according to the embodiments shown in the figures. Herein

FIG. 6A, 6B show views of the detent fitting and the free-pivoting mechanics for the actuated detent fitting;

FIG. 8A, 8B show views of the detent fitting and the free-pivoting mechanics in a first intermediate state when actuating the free-pivoting mechanics;

FIG. 9A, 9B show views of the detent fitting and the free-pivoting mechanics in a second intermediate state when actuating the free-pivoting mechanics;

FIG. 10A, 10B show views of the detent fitting and the free-pivoting mechanics in a free-pivoting state of the free-pivoting mechanics in which both the detent fitting as well as the free-pivoting mechanics are unlocked and, hence, a free-pivoting is possible;

FIG. 12 shows a view of a detent fitting on a vehicle seat and a free-pivoting mechanics arranged axially outside of the detent fitting;

FIG. 13 shows a view of a detent fitting on a vehicle seat and a free-pivoting mechanics arranged axially within the detent fitting;

DETAILED DESCRIPTION

Figure 1:
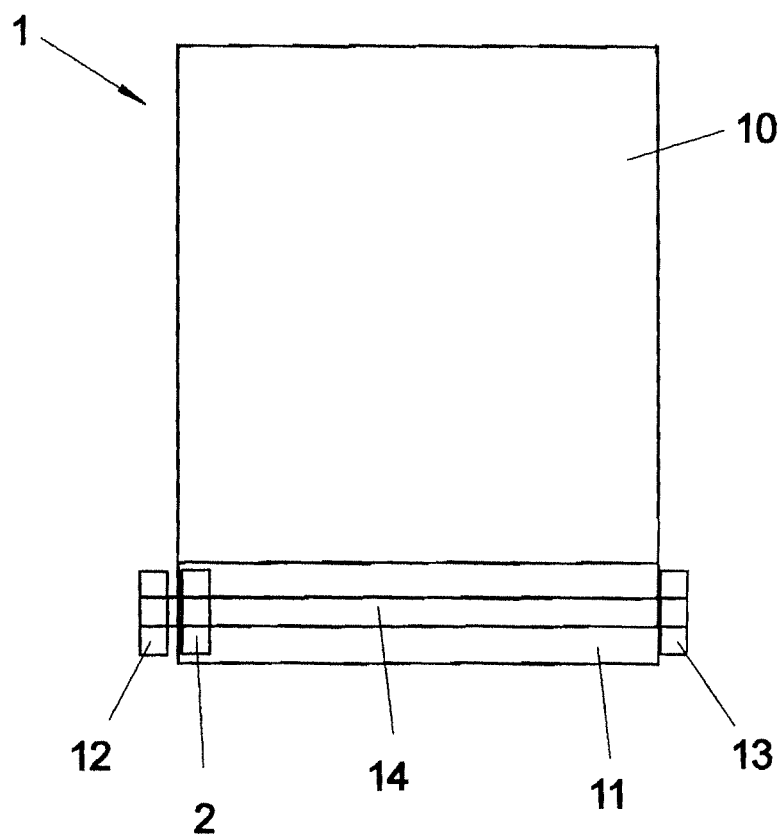
FIG. 1 shows a schematic view of a vehicle seat with detent fittings arranged on both sides.

FIG. 1 shows in an overview a vehicle seat 1 with a backrest 10 which via detent fittings 12, 13 arranged on both sides of the vehicle seat 1 is connected to a seat part 11. The vehicle seat 1 can for example be a front seat of a motor vehicle, wherein the detent fittings 12, 13 connect the backrest 10 with the seat part 11 and introduce, in a locked state, forces acting onto the backrest 10 into the seat part 11 and via the seat part 11 into a vehicle floor.

Figure 2:
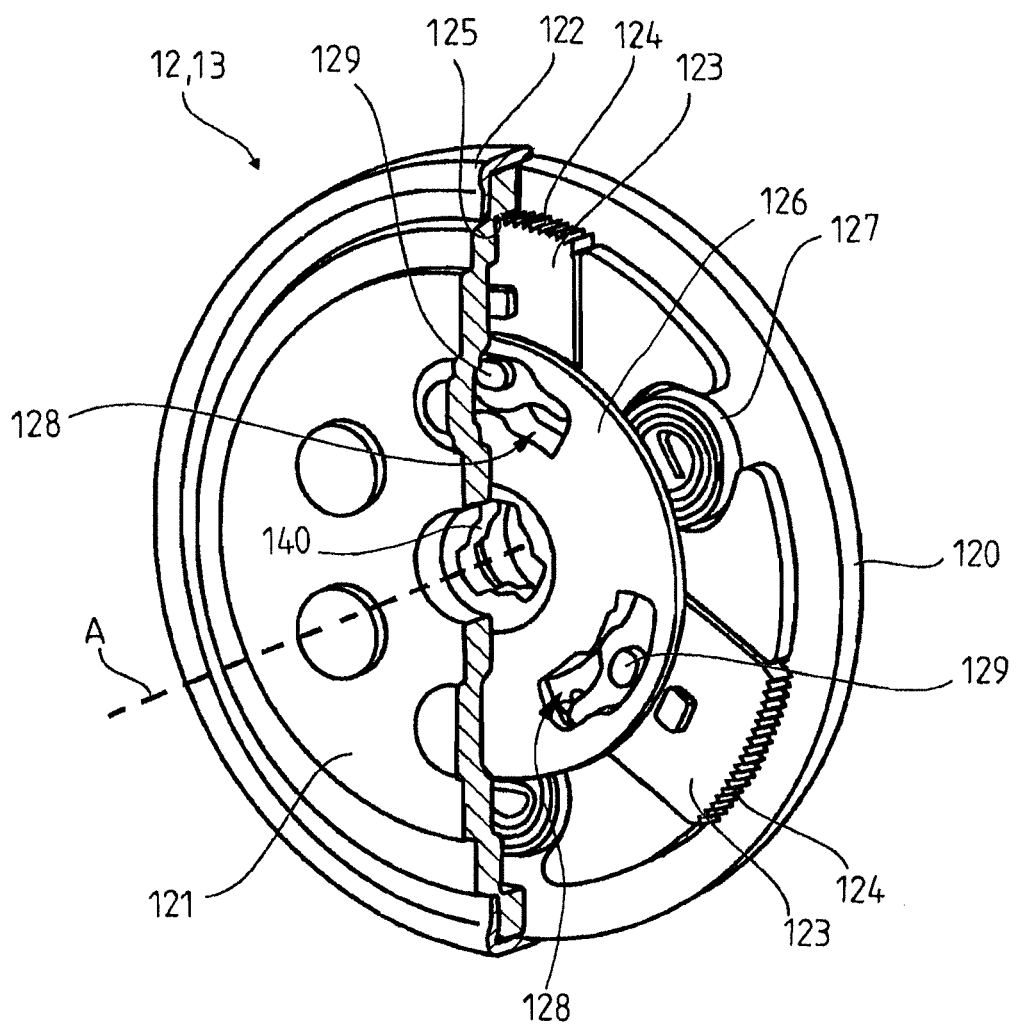
FIG. 2 shows a perspective view of an embodiment of a detent fitting with three pawl elements for locking the detent fitting.
Figure 3A:
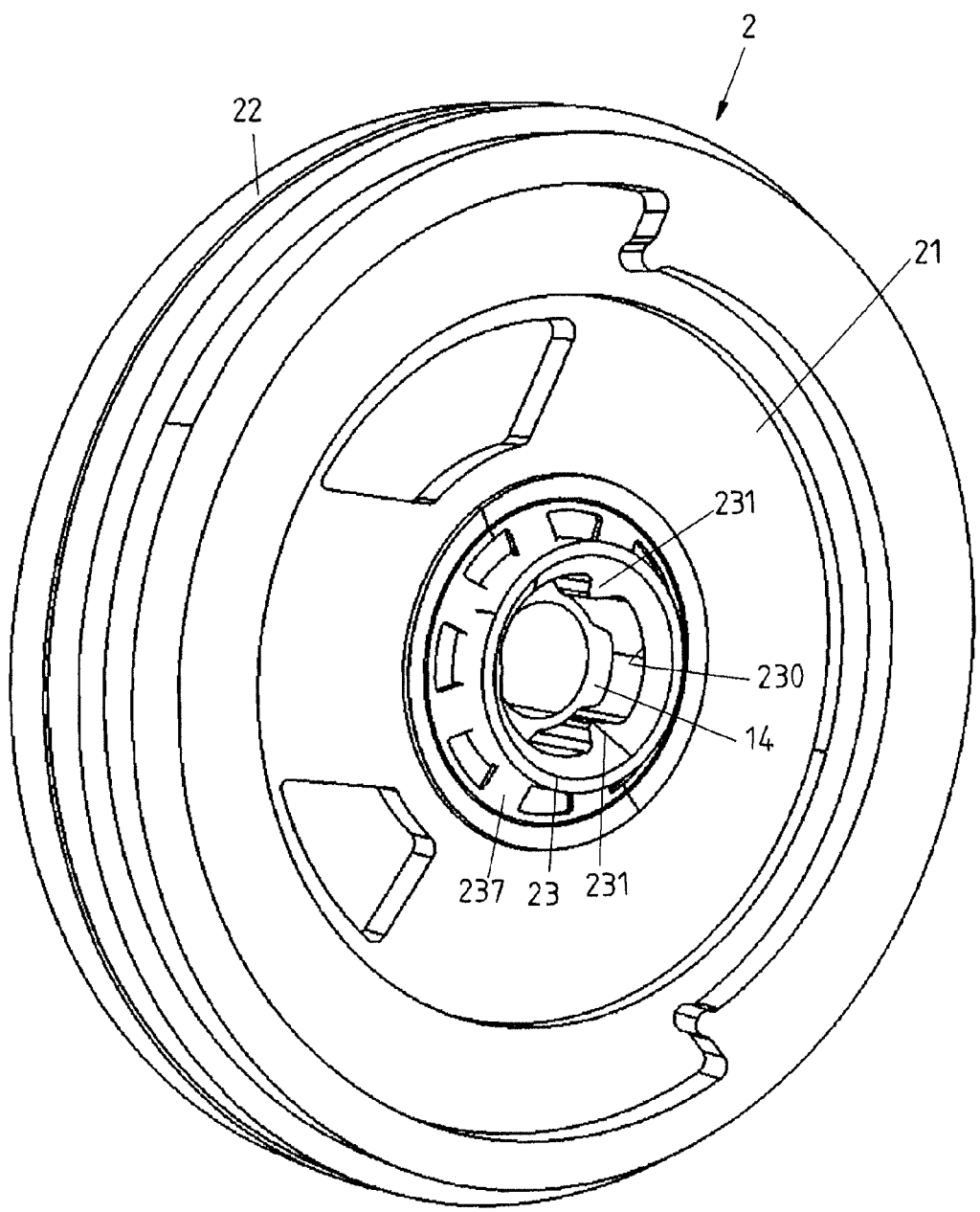
FIG. 3A, 3B show perspective views of a free-pivoting mechanics for interaction with a detent fitting.
Figure 3B:
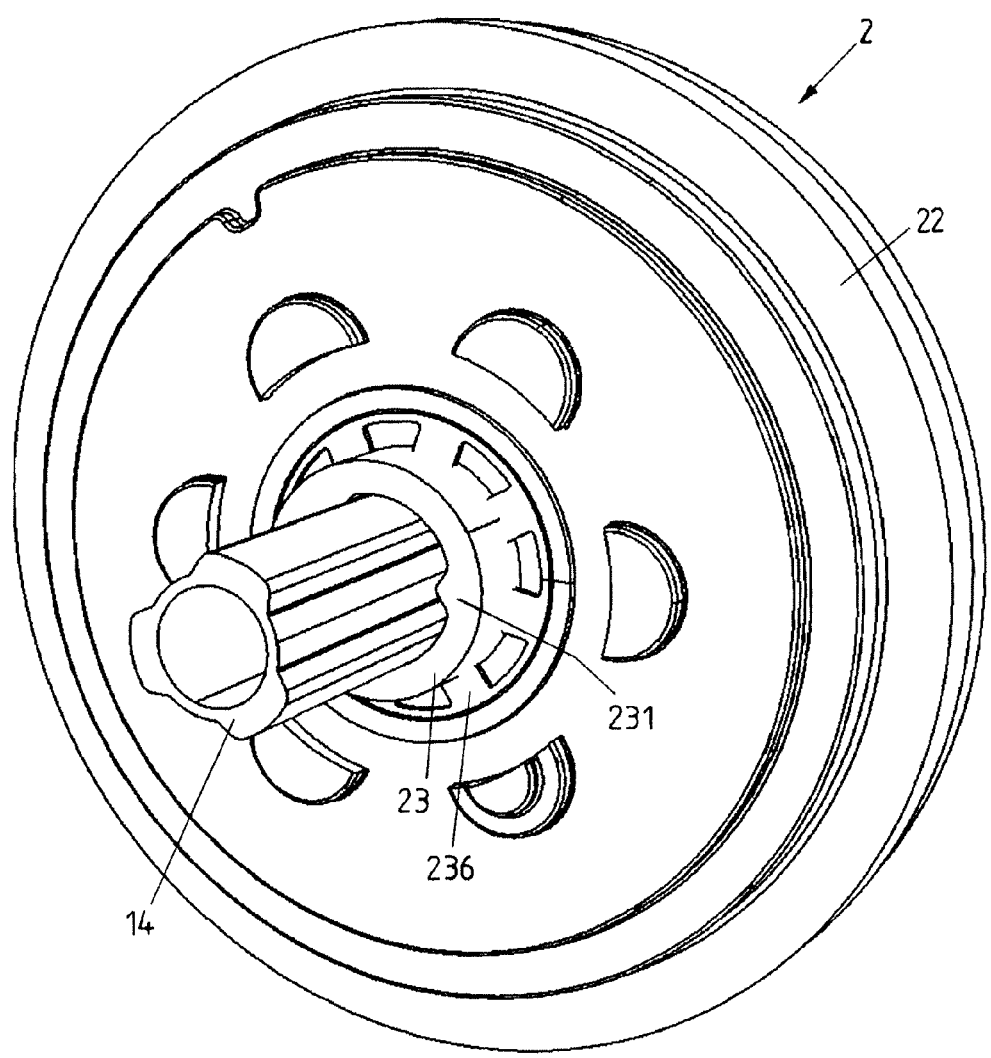
Figure 4A:
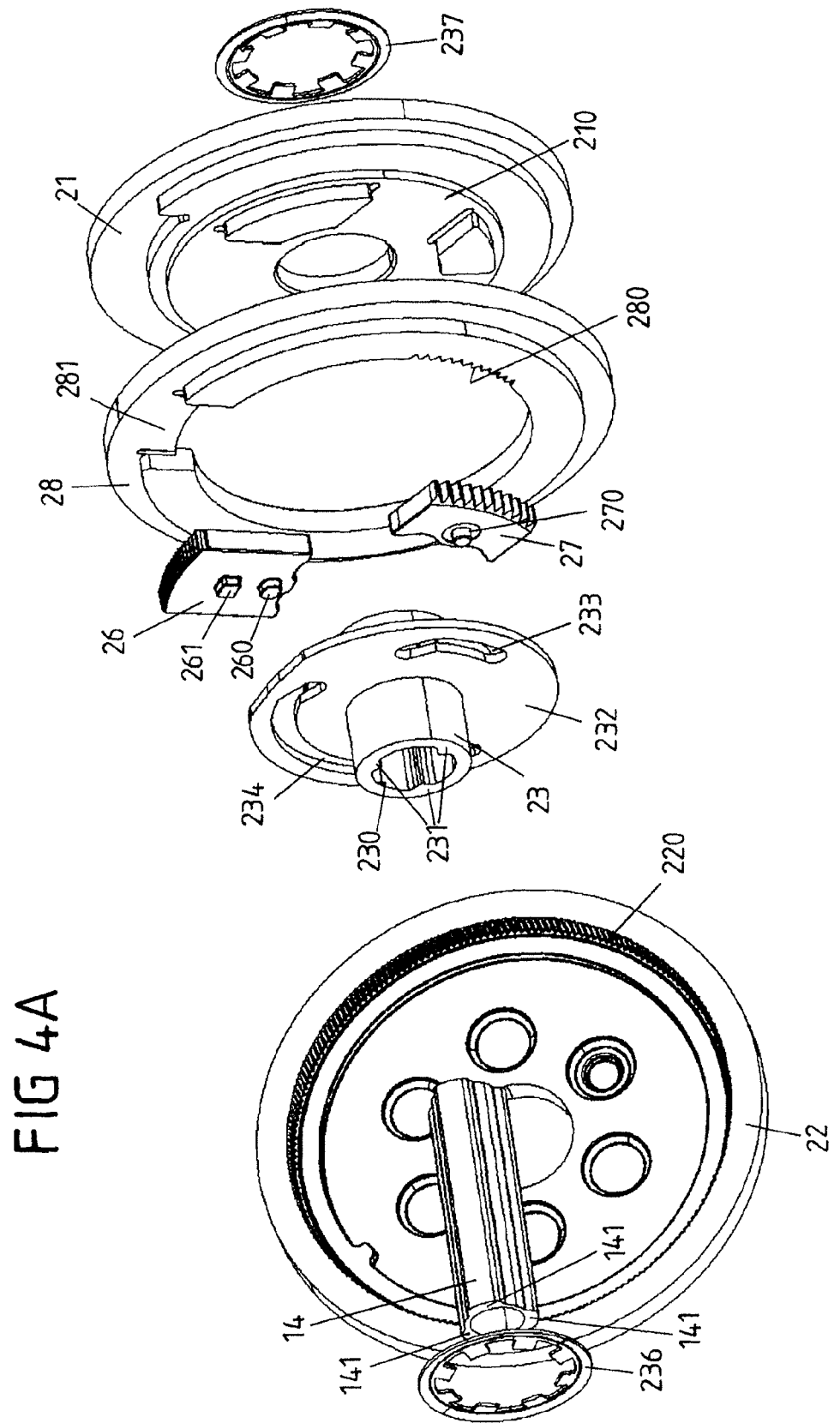
FIG. 4A, 4B show explosive views of the free-pivoting mechanics according to FIG. 3A, 3B.
Figure 4B:
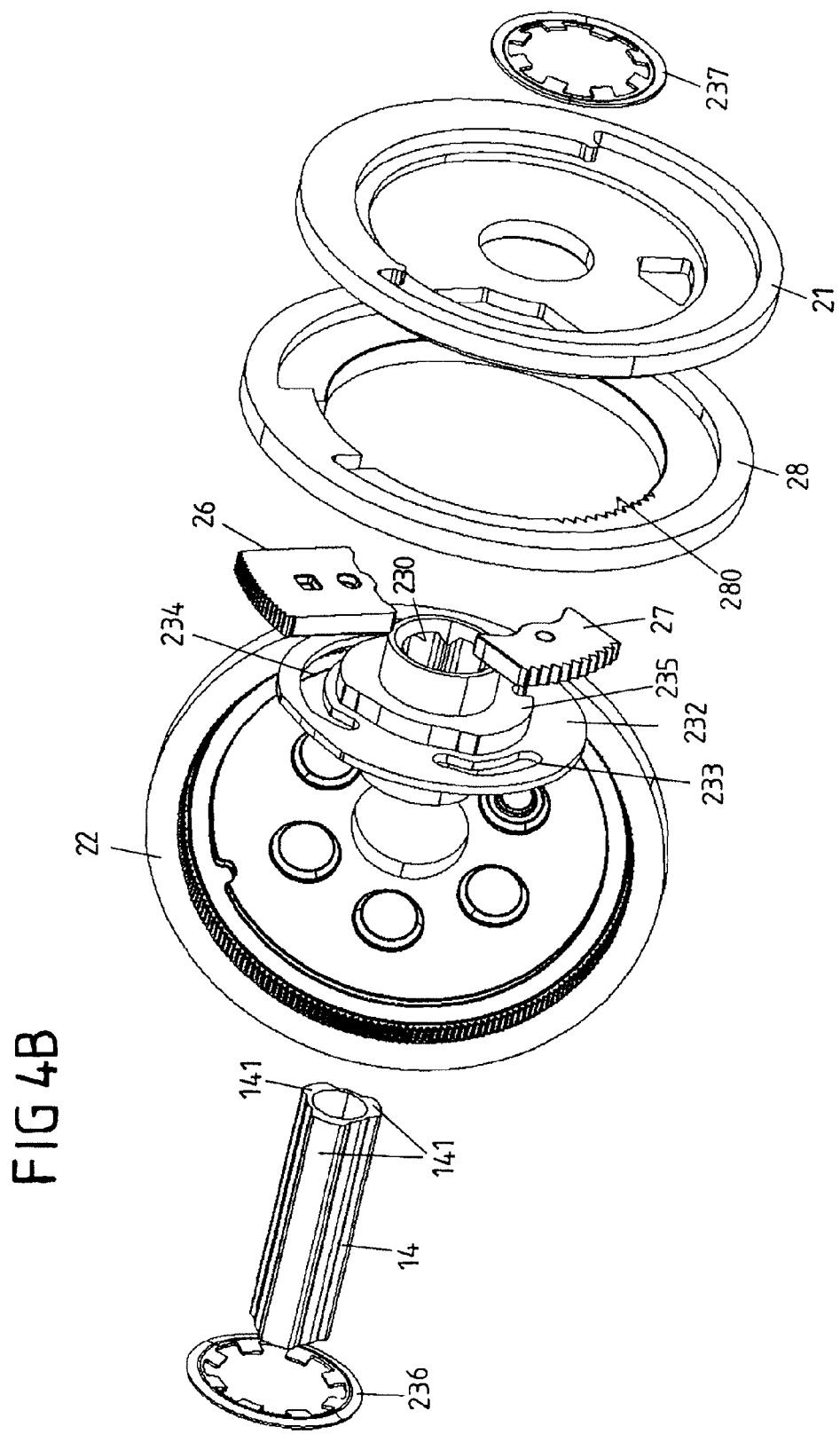

The detent fittings 12, 13 can for example in a specific embodiment be formed as shown in FIG. 2. The detent fittings 12, 13 comprise a first fitting part 120 connected in a rotationally fixed manner with the seat part 11 and a second fitting part 121 connected in a rotationally fixed manner with the backrest 10, which via a holding ring 122 are pivotally mounted on each other. On the first fitting part 120 three locking pawls 123 are arranged in a radially movable fashion, wherein the pawl elements 123 comprise an outer toothing 124 which is constituted to come, in a locked state of the detent fitting 12, 13, into engagement with an inner toothing 125 on the second fitting part 121.

For actuation each detent fitting 12, 13 comprises a control disc 126 with a cam disc arranged on the back side thereon which via slotted guides 128 interacts with noses 129 on the pawl elements 123 and, when turning the control disc 126, moves the pawl elements 123 into a radially inner position and thereby unlocks the detent fitting 12, 13.

The control disc 126 with the cam disc arranged on the back side thereon is via springs 127 pretensioned into the locked state such that after actuating the detent fitting 12, 13 and releasing the actuation the control disc 126 tends towards its locked initial state and, via the cam disc arranged on the backside of the control disc 126, moves the pawl elements 123 again radially outwards and thereby locks the detent fitting 12, 13.

As schematically indicated in FIG. 1 the detent fittings 12, 13 are actuated via a common actuation shaft 14. The actuation shaft 14 reaches through a cutout 140 of the control disc 126 and is in a positive locking manner in engagement with the control disc 126 such that a torque for actuating the respective detent fitting 12, 13 is transferred onto the control disc 126.

In principle it is to be noted that within the context of the instant invention fundamentally also other embodiments of detent fittings than the ones in FIG. 2 are conceivable.

On the vehicle seat 1 according to FIG. 1 additionally a free-pivoting mechanics 2 is arranged which is actuatable according to the idea of the invention to disrupt the force flow between the two vehicle parts in the shape of the backrest 10 and the seat part 11 for providing a free-pivoting function and, therein, interacts with the actuation shaft 14 to provide the free-pivoting function.

Views of an embodiment of such a free-pivoting mechanics are shown in FIG. 3A, 3B and FIG. 4A, 4B in perspective outer views and in perspective explosive views. The free-pivoting mechanics 2 comprises a guide plate 21, a tooth plate 22 and a control element 23 which each are arranged concentrically to the drive shaft 14 of the detent fitting assembly according to FIG. 1. The free-pivoting mechanics 2 comprises further an intermediate ring 28 which is arranged between the guide plate 21 and the tooth plate 22. In the mounted state the guide plate 21, the intermediate ring 28 and the tooth plates 22 are held on the control element 23 via clamp rings 236, 237.

The free-pivoting mechanics 2 comprises two pawl elements 26, 27 of which a first pawl element 27 is arranged in a radially movable manner on the guide plate 21 and a second pawl element 26 is arranged in a radially movable manner on the intermediate ring 28. On the guide plate 21 and the intermediate ring 28, for this purpose, a radial guide 210, 281 each are formed which allow for a radial movement of the respective pawl element 26, 27 on the guide plate 21 respectively the intermediate ring 28.

The pawl elements 26, 27 comprise on their radially outer edge each a toothing or a frictional face for a force locking or frictional locking engagement with the tooth plate 22 respectively the intermediate ring 28.

On the control element 23 a control disc 232 is provided on whose back side a cam disc 235 is formed. The control disc 232 comprises slotted guides 233, 234 into which each a protrusion 260, 270 of the pawl elements 26, 27 engages. Together with the cam disc 235 the slotted guides 233, 234 serve for actuating the pawl elements 26, 27 to displace them radially and to thereby bring them into a locked state or into an unlocked state.

The control element 23 comprises a central bore 230 which is penetrated by the actuation shaft 14 (or a sub piece to be arranged on the actuation shaft 14 and to be connected with the actuation shaft 14). On the inner face of the bore 230 noses 231 running in the axial direction are formed which are constituted to interact, for actuating the actuation shaft 14, with radially projecting protrusions 141 formed on the actuation shaft 14.

The free-pivoting mechanics 2 provides a free-pivoting function for the vehicle seat 1 (see FIG. 1). A free-pivoting function, herein, is understood as allowing a free pivoting of the backrest 10 with respect to the seat part 11 independent of the usual actuation of the detent fitting 12, 13. When actuating the free-pivoting mechanics 2 the backrest 10 can be pivoted, hence, freely with respect to the seat part 11 without the detent fittings 12, 13 being able to lock during the pivoting.

The free-pivoting mechanics 2 is formed as a separate structural unit and can in a modular fashion be arranged on the detent fitting assembly according to FIG. 1.

The function of the free-pivoting mechanics 2 shall subsequently be explained according to FIGS. 5 to 11. In FIGS. 5A, 5B and 6A, 6B herein first the state of the detent fittings 12, 13 and the free-pivoting mechanics 2 during normal operation, namely when actuating the detent fittings 12, 13 is shown, whereas in FIG. 7A, 7B, 8A, 8B, 9A, 9B, 10A, 10B, 11A, 11B the detent fittings 12, 13 and the free-pivoting mechanics 2 are shown in different states when actuating the free-pivoting mechanics 2.

Figure 5B:
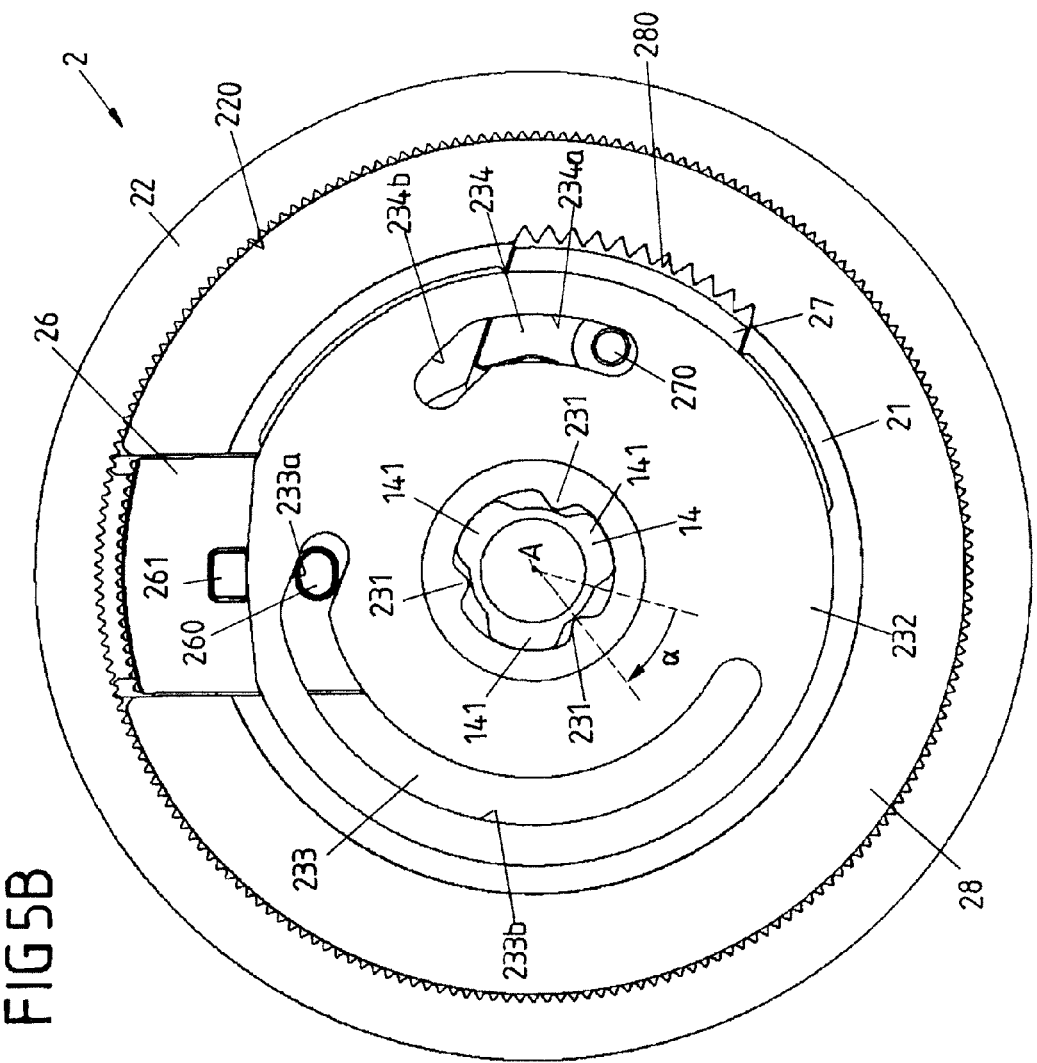
FIG. 5A, 5B show views of a section of a detent fitting and a free-pivoting mechanics each in a normal operational state in which the detent fitting is locked and the free-pivoting mechanics is unlocked.
Figure 5A:
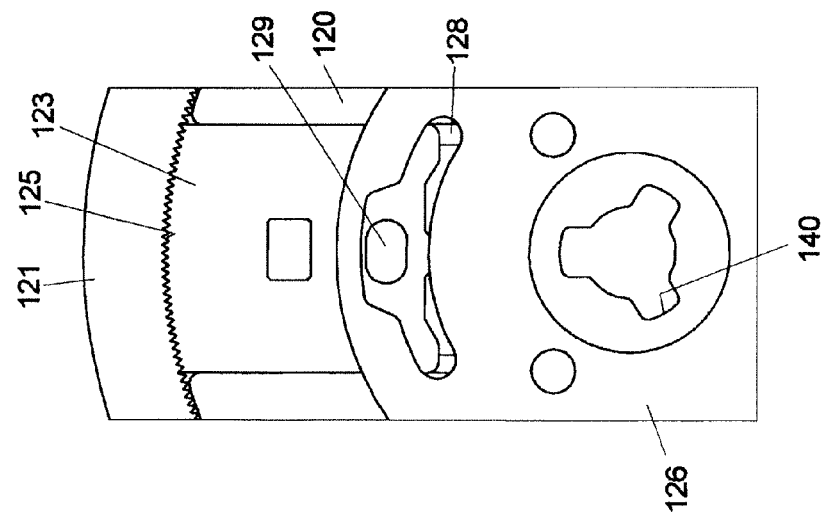

If the inclination of the backrest 10 is to be adjusted, the actuation shaft 14 is rotated via an actuation element provided for this purpose. FIG. 5A, 5B here show first a section of one of the detent fittings 12, 13 (FIG. 5A) and the free-pivoting mechanics 2 (FIG. 5B) prior to actuation, namely in a normal operational state during which neither the detent fittings 12, 13 nor the free-pivoting mechanics 2 are actuated. In this usual state the detent fittings 12, 13 are in a locked state. The pawl elements 123 are in engagement with the toothing 125 of the second fitting part 121 and, thus, lock the first fitting part 120 with the second fitting part 121 and in this way the backrest 10 to the seat part 11. At the same time the free-pivoting mechanics 2 is in an unlocked state in which the pawl element 26 which is radially guided on the intermediate ring 28 is not in engagement with the inner toothing 220 of the tooth plate 22. Although the other pawl element 27 which is radially guided on the guide plate 21 is in engagement with a toothing 280 of the intermediate ring 28 and thereby locks the guide plate 21 with the intermediate ring 28, the guide plate 21 can freely be pivoted relative to the tooth plate 22 such that the free-pivoting mechanics 2 does not oppose a movement of the backrest 11 with respect to the seat part 10.

The cutout 140 of the control disc 126 of the detent fittings 12, 13 is penetrated in a positive locking manner by the actuation shaft 14 which at the same time also is arranged in the bore 230 of the control element 23. As visible from FIG. 5B the protrusions 141 of the actuation shaft 14 in the non-actuated state are not in contact with the noses 131 on the inner face of the bore 230. The actuation shaft 14, hence, in the non-actuated state of the free-pivoting mechanics 2 is not in operational connection with the control element 23.

As also is visible from FIG. 5B the actuation shaft 14 can be rotated about an angle in the clockwise direction before the protrusions 141 come into contact with the noses 231.

If, as shown in FIGS. 6A and 6B, the actuation shaft is rotated for actuating the detent fittings 12, 13 in the clockwise direction, the control disc 126 rotates also in the clockwise direction such that via the slotted guides 128 the pawl elements 123 are drawn radially inwards and, thus, are brought out of engagement with the second fitting part 121. The decent fittings 12, 13, hence, are unlocked.

At the same time the free-pivoting mechanics 2 is not subjected by the movement of the actuation shaft 14. The rotational angle of the actuation shaft 14 is, namely, smaller than the angle α (or at maximum equally large) such that when rotating the actuation shaft 14 in the clockwise direction the protrusions 141 do not come into contact with the noses 231 and in this way actuation shaft 14 and control element 23 do not interact. During normal actuation of the detent fittings 12, 13 via the actuation shaft 14 the free-pivoting mechanics 2, hence, does not influence the operation of the assembly.

The presence of the free-pivoting mechanics 2, thus, has no effects on the normal operation of the detent fittings 12, 13. In particular, the free-pivoting mechanics 2 during normal operation, in particular in the locked state of the detent fittings 12, 13, is completely outside of the force flow between the backrest 10 and the seat part 11 such that the free-pivoting mechanics 2 does not have to absorb forces acting onto the backrest 10. The free-pivoting mechanics 2 accordingly can be dimensioned lightly.

FIGS. 7A, 7B, 8A, 8B, 9A, 9B, 10A, 10B and 11A, 11B show different states of the detent fittings 12, 13 and the free-pivoting mechanics 2 when the free-pivoting mechanics 2 is actuated. For this the control element 23 is moved for example via a separately provided actuation lever or a Bowden pulley acting onto the control element 23.

Figure 7B:
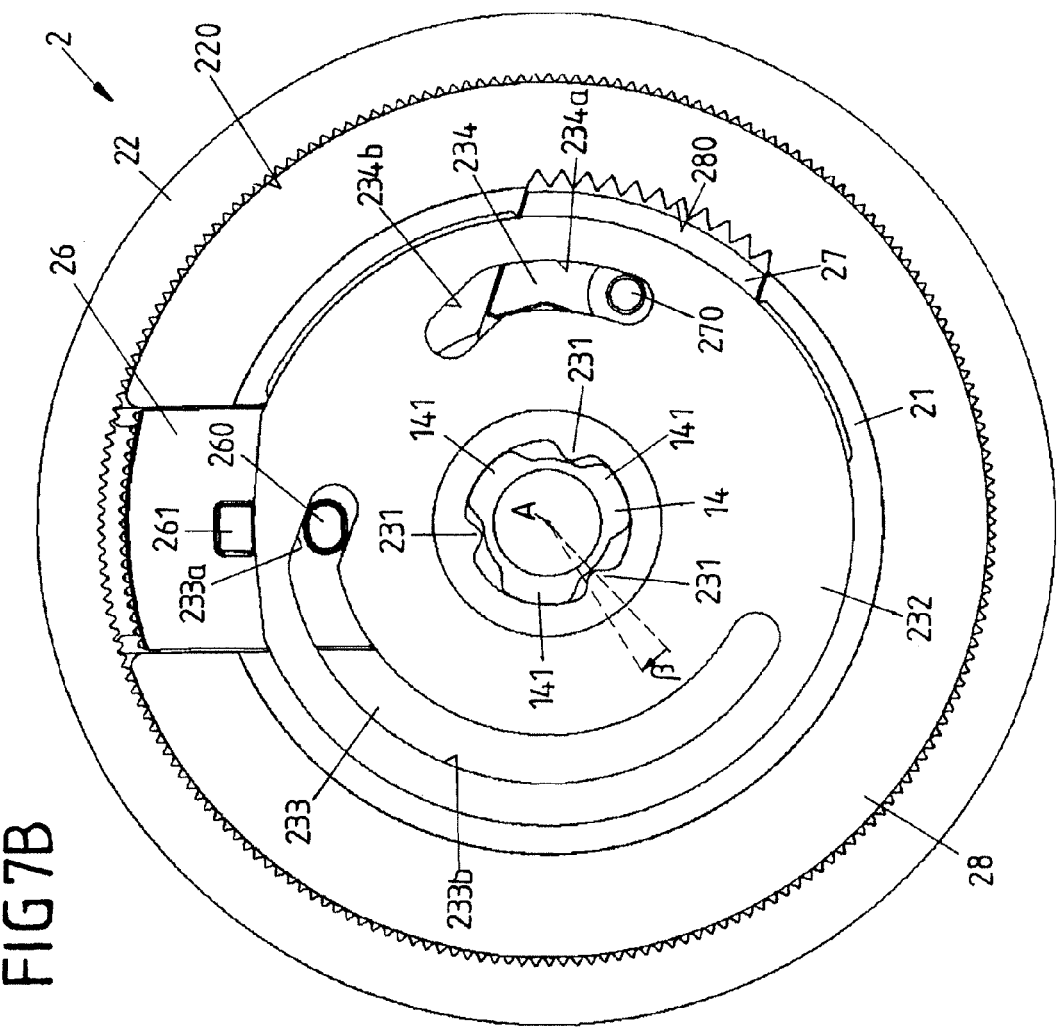
FIG. 7A, 7B show views of the detent fitting and the free-pivoting mechanics again in the normal operational state.
Figure 7A:
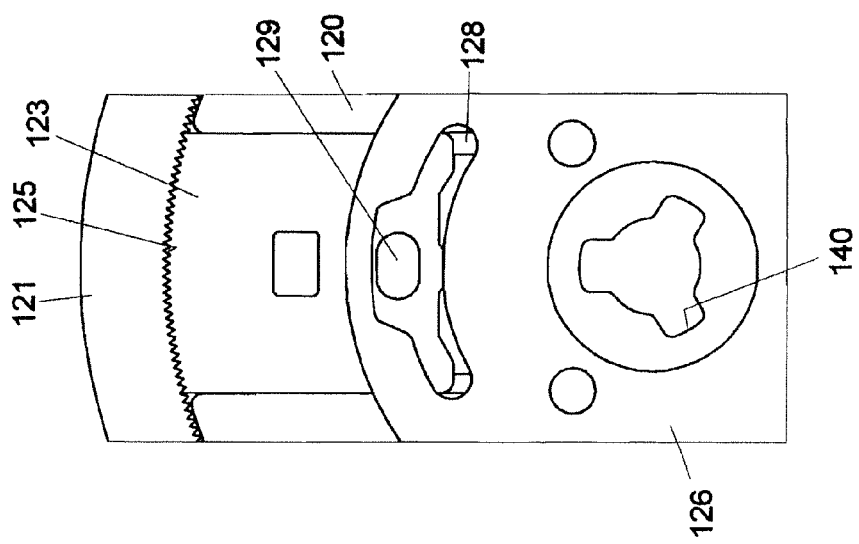

FIG. 7A, 7B show, first, the initial state corresponding to the normal operation state according to FIG. 5a, 5B in which neither the detent fittings 12, 13 nor the free-pivoting mechanics 2 are actuated. The detent fittings 12, 13 are locked (FIG. 7A), whereas the free-pivoting mechanics 2 is unlocked (FIG. 7B) and, hence, has no influence on the operation of the assembly (in particular the free-pivoting mechanics 2 is, as explained above, outside of the force flow of the backrest 10 and the seat part 11).

If now, as shown in FIG. 8A, 8B, the free-pivoting mechanics 2 is actuated in that the control element 23 is rotated in the clockwise direction, the control element 23 with the noses 231 after moving about an angle β (see FIG. 7B) comes into contact with the protrusions 141 of the actuation shaft 14. The control element 23, thus, after moving about the angle β, which for example may amount to 10°, interacts with the actuation shaft 14.

By rotating the control element 23 and the control discs 232 connected with the control element 23 the slotted guides 133, 234 move relative to the protrusion 260 of the pawl element 26 and the protrusion 270 of the pawl element 27. As visible from FIG. 8B after rotating the control element 23 about the angle β the protrusion 270 of the pawl element 27 is situated still in a section 234a of the slotted guide 234 which is bent in the shape of a circular segment and comprises a constant radius about the rotational axis A. The protrusion 260 of the pawl element 26 in contrast moves, by rotating the control disc 232, in an oblique running section 233a of the slotted guide 233 and is pushed radially outwards by the cam disc 235 arranged on the control disc 232 when rotating the control disc 232 in the clockwise direction such that the pawl element 26 is pushed radially outwards and comes into engagement with the toothing 220 of the tooth plate 22 (FIG. 8B).

In the first intermediate state according to FIG. 8A, 8B the detent fittings 12, 13 hence still are locked, whereas at the same time the free-pivoting mechanics 2 also is locked in that both the pawl element 26 is in engagement with the tooth plate 22 and the pawl element 27 is in engagement with the intermediate ring 28. The first intermediate state corresponds to the state after turning the control element 23 about the angle β, for example corresponding to 10°.

In the first intermediate state according to FIG. 8A, 8B the force flow extends both via the detent fittings 12, 13 and via the free-pivoting mechanics 2 which thus is connected in parallel to the detent fittings 12, 13. The substantial forces still are absorbed via the detent fittings 12, 13.

FIG. 9A, 9B show a second intermediate state in which the control element 23 has been rotated further in the clockwise direction. Through the contact of the noses 231 with the protrusions 141 the rotation of the control element 23 causes a rotation of the actuation shaft 14 which causes that the control disc 126 of the detent fittings 12, 13 also is rotated and thereby the pawl elements 123 of the detent fittings 12, 13 are moved radially inwards and the detent fittings 12, 13 are unlocked. At the same time the free-pivoting mechanics 2 is (still) locked because the locking pawls 26, 27 are in engagement with the tooth plate 22 respectively the intermediate ring 28. In the second intermediate state according to FIG. 9A, 9B the force flow between the backrest 10 and the seat part 11, thus, extends completely via the free-pivoting mechanics 2 such that the free-pivoting mechanics 2 must be sufficiently dimensioned at least such that it can absorb the loading forces occurring therein. Because in general no large loads of the backrest 10 need to be assumed during a free-pivoting, no excessive requirements with respect to the dimensioning of the free-pivoting mechanics 2 need to be raised (in addition it may also be provided to provide a slip-through of the free-pivoting mechanics 2 at excessive loading forces in that the engagement of the locking pawl 26 and/or the locking pawl 27 is formed in a slipping fashion at an excessive load).

The rotational angle corresponding to the second intermediate state according to FIG. 9A, 9B may for example amount to 28° (measured from the initial state according to FIG. 7A, 7B) of the control element 23. As visible from FIG. 9B at this rotational angle the protrusion 260 of the pawl element 26 is situated in the section 233b of the slotted guide 233 in the shape of a circular segment and, thus, is held on a constant radius, whereas the protrusions 170 of the pawl element 27 has reached the end, facing the section 234b, of the section 234a of the slotted guide 234 in the shape of a circular segment.

If the control element 23 is moved further in the clockwise direction, the free-pivoting mechanics 2 reaches a free-pivoting state. This is shown in FIG. 10A, 10B. In this state the detent fittings 12, 13 are completely unlocked (FIG. 10A). The protrusions 170 of the pawl element 27 enters into the obliquely running section 234b of the slotted guide 234 such that the pawl element 27 thereby is drawn radially inwards and, thus, out of engagement with the toothings 180 of the intermediate ring 28. Thereby, the guide plate 21 is unlocked from the intermediate ring 28 such that the guide plate 21 can be pivoted freely with respect to the intermediate ring 28 and, hence, also with respect to the tooth plate 22. Thus, the force flow between the backrest 10 and the seat part 11 is disrupted, and the backrest 10 can freely be pivoted with respect to the seat part 11.

The rotational angle of the control element 23 in the free-pivoting state according to FIG. 10B amounts to for example 30°.

Figure 11B:
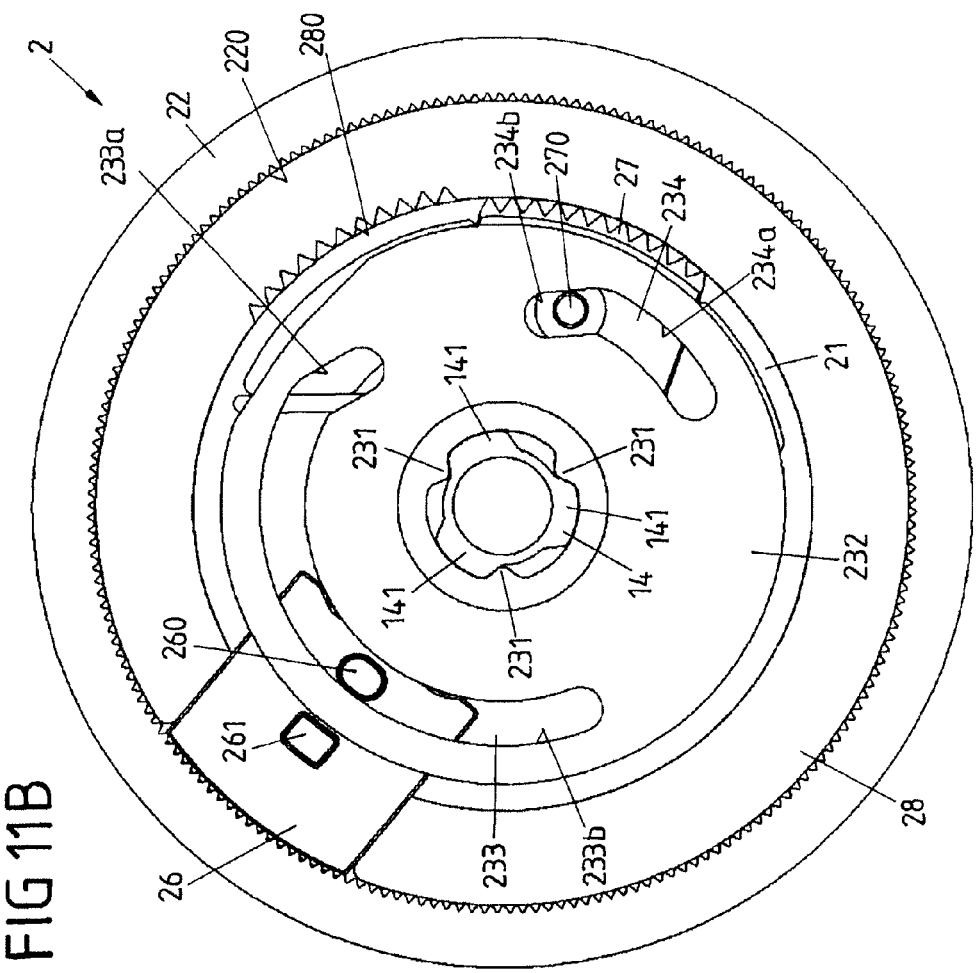
FIG. 11A, 11B show views of the detent fitting and the free-pivoting mechanics in a pivoted state.
Figure 11A:
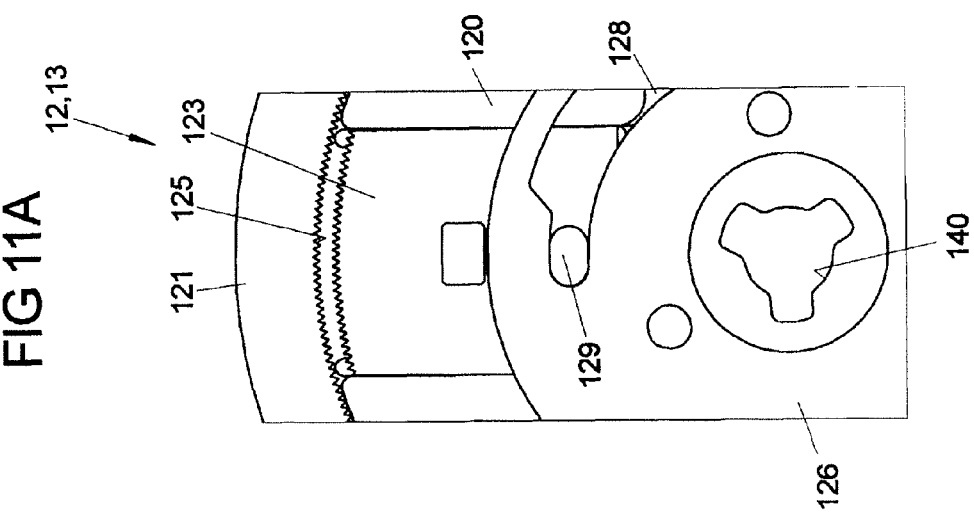

FIG. 11A, 11B show the detent fittings 12, 13 and the free-pivoting mechanics 2 after a pivoting of the backrest 10 into a forward position. As visible from FIG. 11B the tooth plate 22 connected with the backrest 10 and, hence, also the intermediate ring 28 with the pawl element 26 arranged thereon is pivoted in the counter clockwise direction, wherein the pawl element 26 slides with the protrusion 260 along the section 233b, in the shape of a circular segment, of the slotted guide 233. The toothing 280 of the intermediate ring 28 has moved relative to the pawl element 27 (which is held in a locationally fixed manner on the seat part 11 via the guide plate) such that the pawl element 27 is held in its radially inner position, thereby the control element 23 is held with its control disc 232 in its rotated position and also the detent fittings 12, 13 are held in their unlocked state (in that the pawl element 27 cannot move radially outwards, the control disc 132 cannot rotate back in the counter clockwise direction such that also the actuation shaft 14 cannot rotate back and the detent fittings 12, 13 cannot lock). During free-pivoting, hence, a locking of the detent fittings 12, 13 is prevented such that the free-pivoting can take place in an unhindered manner and also a releasing of the actuation lever of the free-pivoting mechanics 2 does not cause the backrest 10 to be locked relative to the seat part 11.

The control element 23 may be pretensioned relative to the guide plate 21 by means of a spring element such that the control element 23 tends to rotate back into its initial state (FIG. 7B).

If the backrest 10 is pivoted back, the pawl element 27 is moved into engagement with the toothing 280 as soon as the backrest 10 again is in its initial position according to FIG. 10A, 10B. Via the second intermediate state according to FIG. 9A, 9B and the first intermediate state according to FIG. 8A, 8B the detent fittings 12, 13 and the free-pivoting mechanics 2 again come into their initial state in which the backrest 10 via the detent fittings 12, 13 is locked relative to the seat part 11 and the force flow extends completely over the detent fittings 12, 13.

The free-pivoting mechanics 2 in this way at the same time provides a memory function in that it ensures that after a free-pivoting the backrest 10 arrives back at its initial position and is automatically locked again in this initial position. This is achieved through the pawl element 26 which may also be denoted as "memory stone" and serves for storing the initial position of the backrest 10.

The engagement of the pawl element 26 and/or the pawl element 27 with the tooth plate 22 respectively the intermediate ring 28 may take place in a force locking manner via a toothing arranged on the outside of the pawl element 26 respectively 27 or in a frictionally locking manner via a friction face arranged on the outside. If a toothing is provided on the outside of the pawl element 26 for establishing the locking, this toothing as well as the inner toothing 220 of the tooth plate 22 advantageously comprise the same teeth partitioning as the locking pawl 123 and the inner toothing 125 of the second fitting part 121 of the detent fittings 12, 13.

Advantageously, the pawl elements 26, 27 are mounted elastically and are pretensioned with a tendency towards their locked state. Thereby, a play between the pawl elements 26, 27 and the associated toothings 220 respectively 280 can be reduced.

The free-pivoting mechanics 2 can be formed in a modular way as a separate structural unit to the detent fittings 12, 13. Herein, only one free-pivoting mechanics 2 per vehicle seat is required and serves for providing a free-pivoting function for the two detent fittings 12, 13 arranged on both sides of the vehicle seat 1 (see FIG. 1).

Different arrangements of the free-pivoting mechanics 2 are possible and conceivable.

In a first possible arrangement according to FIG. 12 the free-pivoting mechanics is arranged axially outside of the detent fitting 12.

Within a second possibility according to FIG. 13 the free-pivoting mechanics 2 is arranged axially inside of the detent fitting 12. The advantage of the variant according to FIG. 13 is that the structural space axially outside of the detent fitting 12 is not increased but the free-pivoting mechanics is arranged in a space which commonly is not used and, thus, is readily available.

Figure 14:
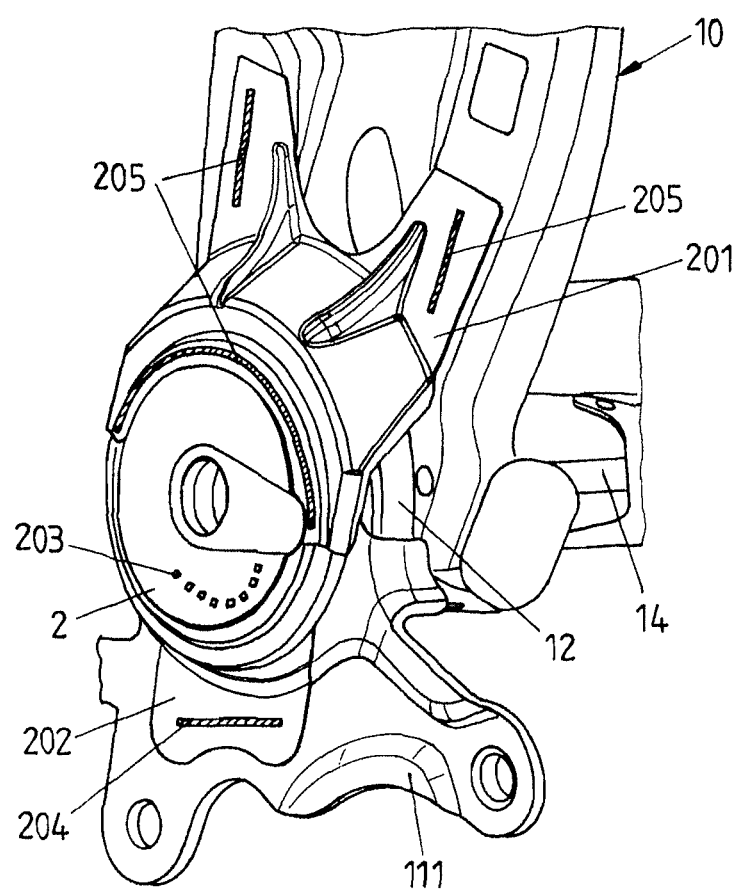
FIG. 14 shows a perspective view of a free-pivoting mechanics axially outside of a detent fitting on a vehicle seat.

FIG. 14 shows the connection of the free-pivoting mechanics 2 when arranging the free-pivoting mechanics 2 axially outside of the detent fitting 12. The free-pivoting mechanics 2 is arranged on the backrest 10 by means of the tooth plate 22 fixedly connected to the backrest (see FIG. 4A, 4B) via a fixing plate 201 and at the same time is connected by means of the guide plate 21 fixedly connected to the seat via a further fixing plate 202 to the detent fitting 12 and a fixing plate 111 fixedly connected to the seat for connecting to the seat part 11.

For the assembling, herein, one can proceed in the following way: First, a first welded seam 203 for connecting the guide plate 21 with the fixing plate 202 is produced; then the fixing plate 202 is welded via a welded seam 204 to the fixing plate 111, and finally the fixing plate 201 is welded via welded seams 205 to the backrest 10 and the tooth plate 22.

Figure 15:
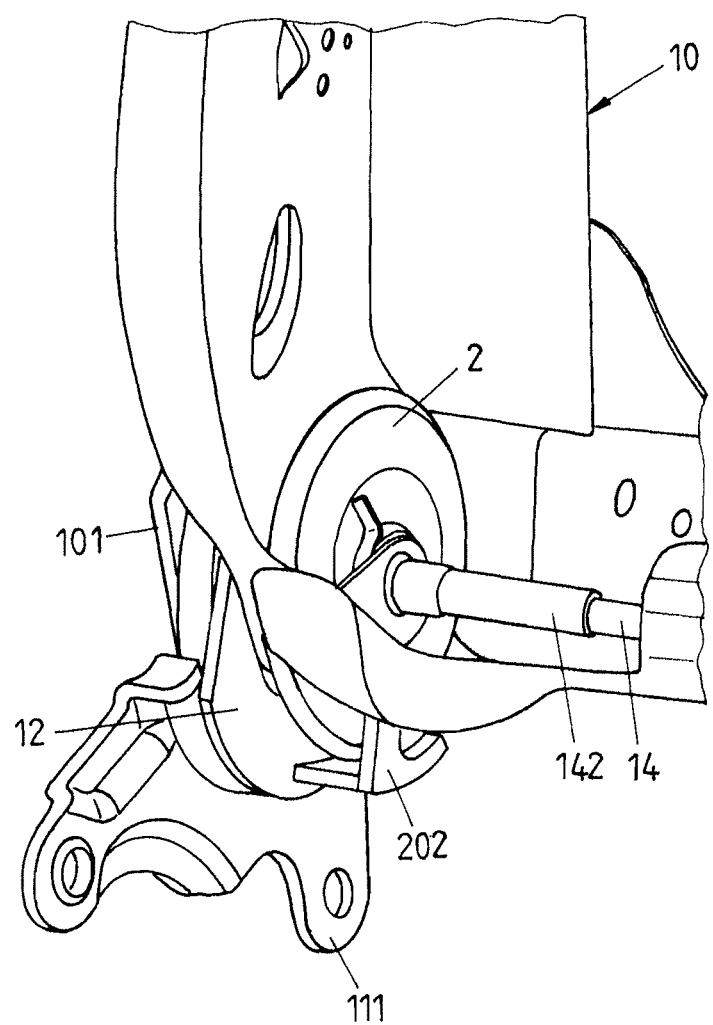
FIG. 15 shows a perspective view of a free-pivoting mechanics axially inside of a detent fitting on a vehicle seat and FIG. 16 shows a schematic general diagram showing the process for providing a free-pivoting function for a vehicle seat.

FIG. 15 shows the arrangement of the free-pivoting mechanics 2 axially inside the detent fitting 12, in which a fixing plate 202 for connecting the guide plate 21 with the fixing plate 111 is provided on the side of the seat part 11. For the assembling first the tooth plate 22 is welded to the backrest 10, then the detent fitting 12 is connected with the backrest 10, and finally the coupling on the side of the seat takes place by welding the fixing plate 202 to the guide plate 21 and the fixing plate 111.

As shown in FIG. 15, a jacket tube 142 may be provided for the easy alignment of the free-pivoting mechanics 2 relative to the actuation shaft 14, the jacket tube being arranged on the actuation shaft 14 and serving for connecting the actuation shaft 14 with the free-pivoting mechanics 2. The jacket tube 142 may first be arranged on the actuation shaft 14 and be inserted in the free-pivoting mechanics 2 in order to be connected, for example welded, to the actuation shaft after alignment relative to the free-pivoting mechanics 2.

Figure 16:
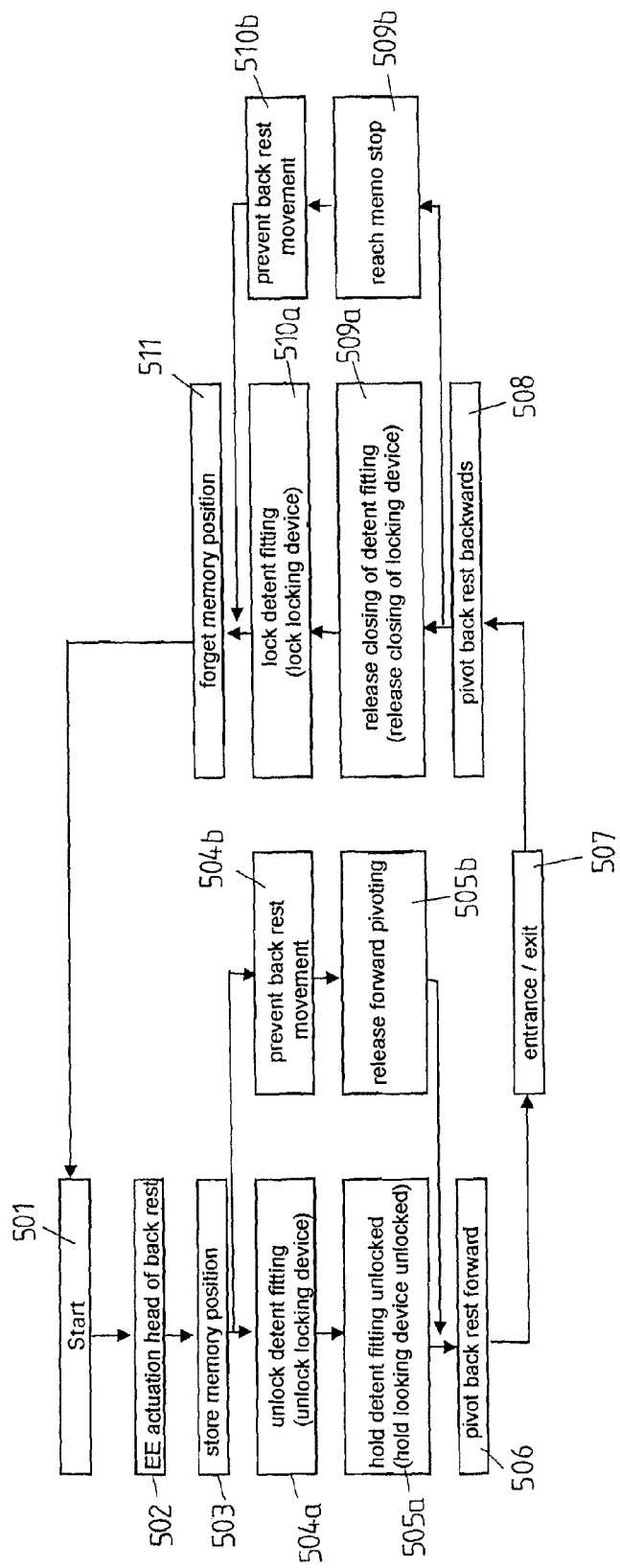

FIG. 16 shows, in a schematic overview, the process for providing a free-pivoting function by means of a free-pivoting mechanics, as it has been described according to a specific embodiment previously. For providing the free-pivoting function it is started from an initial state (step 501) in which the detent fittings 12, 13 are locked and the free-pivoting mechanics 2 is unlocked. For providing the free-pivoting function (for example for an easy-entry function) an actuation element on the backrest 10 is actuated (step 502) whereby the free-pivoting mechanics 2 for storing the initial position of the backrest 10 is actuated (step 503; compare the state in FIG. 8A, 8B). Subsequently, the functional threads separate. On the one hand in step 504*a* the detent fittings 12, 13 are unlocked, on the other hand in step 504*b* a locking is established by means of the free-pivoting mechanics 2 such that a movement of the backrest 10 is prevented. The detent fittings 12, 13 are held in the unlocked state (step 505*a*), whereas the free-pivoting mechanics 2 releases the locking and allows the free-pivoting (step 505*b*). In step 506 the backrest 10 can be pivoted forward without the detent fittings 12, 13 coming into their locked state when releasing the actuation lever. In step 507 an easy entrance and exit within the context of an easy-entry function is allowed with the backrest 10 being pivoted forward. In step 508 the backrest 10 is pivoted backwards, wherein in parallel functional threads in step 509*a* on the one hand the locking of the detent fittings 12, 13 is released and in step 509*b* on the other hand the free-pivoting mechanics 2 guides the backrest 10 into its stored initial position. In step 510*a* the locking of the detent fittings 12, 13 is established when reaching the stored initial position and, thus, the backrest 10 is locked, wherein at the same time in step 510*b* also the free-pivoting mechanics 2 is locked and thereby a movement of the backrest is prevented. In step 511 finally the storing of the initial position of the backrest is released and, thus, the free-pivoting mechanics 2 is reset, before the assembly altogether again reaches its initial state according to step 501.

The invention is not limited to the embodiments described previously. In particular also other embodiments of the free-pivoting mechanics 2 and/or the detent fittings are conceivable. Fundamentally, a free-pivoting mechanics of the described kind can be used in particular also in connection with detent fittings which use other locking elements than the described radially movable pawl elements.

What is claimed is:

1. An assembly of a vehicle, comprising:
    a first vehicle part and a second vehicle part being pivotal relative to the first vehicle part;
    at least one detent fitting which is constituted to hold the two vehicle parts in position relative to each other in a locked state and to therein establish a force flow between the two vehicle parts and to allow for a pivoting of the two vehicle parts relative to each other in an unlocked state;
    an actuation shaft to actuate the at least one detent fitting, and
    a free-pivoting mechanics which is actuatable in order to disrupt the force flow between the two vehicle parts to provide a free-pivoting function,
    wherein the free-pivoting mechanics, to provide the free-pivoting function, interacts with the actuation shaft and is operative to interact with the actuation shaft only if the free-pivoting mechanics is actuated,
    wherein the free-pivoting mechanics comprises a guide plate which is arranged in a rotationally fixed manner on one of the two vehicle parts and a tooth plate which is arranged in a rotationally fixed manner on the other of the two vehicle parts, which in a non-actuated state the free-pivoting mechanics are pivotal with respect to each other, and
    wherein the free-pivoting mechanics comprises a first pawl element, which is arranged movably on the guide plate to establish a locking of the guide plate with an intermediate ring pivotally mounted with respect to the tooth plate and to the guide plate, and a second pawl element, which is arranged movably on the intermediate ring to establish a locking of the intermediate ring with the tooth plate.

2. The assembly according to claim 1, wherein the free-pivoting mechanics in a non-actuated state is arranged outside of the force flow between the two vehicle parts.

3. The assembly according to claim 1, wherein the free-pivoting mechanics unlocks the at least one detent fitting when the free-pivoting mechanics is actuated and, thus, allows for free-pivoting of the vehicle parts relative to each other.

4. The assembly according to claim 1, wherein the at least one detent fitting is actuatable independently from the free-pivoting mechanics.

5. The assembly according to claim 1, wherein the free-pivoting mechanics is formed as a structural unit different from the at least one detent fitting.

6. The assembly according to claim 1, wherein the free-pivoting mechanics comprises a control element which is actuatable to actuate the free-pivoting mechanics.

7. The assembly according to claim 6, wherein the control element is arranged on the actuation shaft.

8. The assembly according to claim 6, wherein the control element and the actuation shaft are formed such that the control element comes into operational connection with the actuation shaft if the control element is actuated, however the actuation shaft does not come into operational connection with the control element if the actuation shaft is actuated.

9. The assembly according to claim 6, wherein the control element is arranged concentrically to the actuation shaft and is rotatable about a rotational axis.

10. The assembly according to claim 6, wherein the control element includes noses which interact with an outer contour of the actuation shaft.

11. The assembly according to claim 10, wherein the control element is rotatable about a predefined angular range relative to the actuation shaft, before the noses come into contact with the outer contour of the actuation shaft.

12. The assembly according to claim 6, wherein the control element interacts with the first and second pawl element.

13. The assembly according to claim 12, wherein the control element comprises slotted guides to control the first and second pawl element.

14. The assembly according to claim 1, wherein the free-pivoting mechanics comprises a memory function which, when actuating the free-pivoting mechanics, has the effect that after a pivoting of the second vehicle part out of an initial position the second vehicle part is again locked in the initial position during a backwards pivoting.

15. The assembly according to claim 1, wherein at least one of the first pawl element and the second pawl element comprise a toothing or a friction face to establish the locking.

16. The assembly according to claim 1, wherein in the non-actuated state of the free-pivoting mechanics the first pawl element is in engagement with the intermediate ring to lock the guide plate with the intermediate ring and the second pawl element is not in engagement with the tooth plate such that the intermediate ring is not locked with the tooth plate.

17. The assembly according to claim 1, wherein in a first intermediate state when actuating the free-pivoting mechanics the first pawl element is in engagement with the intermediate ring to lock the guide plate with the intermediate ring, the second pawl element is in engagement with the tooth plate to lock the intermediate ring with the tooth plate and the at least one detent fitting is in a locked state.

18. The assembly according to claim 1, wherein in a second intermediate state when actuating the free-pivoting mechanics the first pawl element is in engagement with the intermediate ring to lock the guide plate with the intermediate ring, the second pawl element is in engagement with the tooth plates to lock the intermediate ring with the tooth plate and the at least one detent fitting is in an unlocked state.

19. The assembly according to claim 1, wherein in a free-pivoting state when actuating the free-pivoting mechanics the first pawl element is not in engagement with the intermediate ring such that the intermediate ring is pivotable relative to the guide plate, the second pawl element is in engagement with the tooth plate to lock the intermediate ring with the tooth plate and the at least one detent fitting is in an unlocked state.

20. The assembly according to claim 1, wherein the guide plate, the tooth plate and the intermediate ring are arranged concentrically to the actuation shaft to actutate the at least one detent fitting.

21. A free-pivoting mechanics for a vehicle seat which is constituted and provided to interact with at least one detent fitting to lock two vehicle parts relative to each other, wherein
    the at least one detent fitting is constituted to hold the two vehicle parts in position to each other in a locked state and to establish a force flow between the two vehicle parts and to allow for a pivoting of the vehicle parts relative to each other in an unlocked state and the free-pivoting mechanics is actuatable in order to disrupt the force flow between the two vehicle parts to provide a free-pivoting function, wherein the free-pivoting mechanics that provides the free-pivoting function is operative to interact with an actuation shaft to actuate the at least one detent fitting only if the free-pivoting mechanics is actuated, wherein the free-pivoting mechanics comprises a guide plate which is arranged in a rotationally fixed manner on one of the two vehicle parts and a tooth plate which is arranged in a rotationally fixed manner on the other of the two vehicle parts, which in a non-actuated state of the free-pivoting mechanics are pivotal with respect to each other, and wherein the free-pivoting mechanics comprises a first pawl element, which is arranged movably on the guide plate to establish a locking of the guide plate with an intermediate ring pivotally mounted with respect to the tooth plate and to the guide plate, and a second pawl element, which is arranged movably on the intermediate ring to establish a locking of the intermediate ring with the tooth plate.

22. A method for providing a free-pivoting function for actuating at least one detent fitting, the at least one detent fitting being constituted to hold two vehicle parts in position to each other in a locked state and to establish a force flow between the two vehicle parts and to allow the vehicle parts to pivot relative to each other in an unlocked state, wherein a free-pivoting mechanics is actuated to disrupt the force flow between the two vehicle parts, wherein the free-pivoting mechanics interacts with an actuation shaft for actuating the at least one detent fitting and comes into operational connection with the actuation shaft only if the free-pivoting mechanics is actuated, wherein the free-pivoting michanics comprises a guide plate which is arranged in a rotationally fixed manner on one of the two vehicle parts and a tooth plate which is arranged in a rotationally fixed manner on the other of the two vehicle parts, which in a non-actuated state of the free-pivoting mechanics are pivotal with respect to each other, and wherein the free-pivoting mechanics comprises a first pawl element, which is arranged movably on the guide plate to establish a locking of the guide plate with an intermediate ring pivotally mounted with respect to the tooth plate and to the guide plate, and a second pawl element, which is arranged movably on the intermediate ring to establish a locking of the intermediate ring with the tooth plate.

* * * * *